United States Patent
Nishigaki et al.

(10) Patent No.: US 11,292,649 B2
(45) Date of Patent: Apr. 5, 2022

(54) PACKAGING BAG

(71) Applicant: TOPPAN PRINTING CO., LTD., Tokyo (JP)

(72) Inventors: Misao Nishigaki, Tokyo (JP); Eriko Nagata, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 547 days.

(21) Appl. No.: 16/003,491

(22) Filed: Jun. 8, 2018

(65) Prior Publication Data

US 2018/0290806 A1   Oct. 11, 2018

Related U.S. Application Data

(63) Continuation of application No. PCT/JP2016/086802, filed on Dec. 9, 2016.

(30) Foreign Application Priority Data

Dec. 11, 2015   (JP) .............................. JP2015-242703
Dec. 24, 2015   (JP) .............................. JP2015-251993

(51) Int. Cl.
    *B65D 75/26*    (2006.01)
    *B65D 81/03*    (2006.01)
    (Continued)

(52) U.S. Cl.
    CPC ................ *B65D 75/26* (2013.01); *B32B 5/18* (2013.01); *B32B 7/12* (2013.01); *B32B 27/065* (2013.01);
    (Continued)

(58) Field of Classification Search
    CPC .... B65D 75/26; B65D 75/5844; B65D 31/02; B65D 75/5827; B65D 81/03; B32B 5/18;
    (Continued)

(56) References Cited

U.S. PATENT DOCUMENTS 3,948,436 A * 4/1976 Bambara ................ B65D 31/02
                                                                      206/523
5,474,818 A * 12/1995 Ulrich ................... B29C 65/086
                                                                      206/447

(Continued)

FOREIGN PATENT DOCUMENTS

GB       2 243 143 A     10/1991
JP       S53-100370 U     8/1978

(Continued)

OTHER PUBLICATIONS

Decision of Refusal dated Jan. 14, 2020 for corresponding Japanese Application No. 2015-242703.

(Continued)

*Primary Examiner* — J. Gregory Pickett
*Assistant Examiner* — Jenine Pagan
(74) *Attorney, Agent, or Firm* — Foley & Lardner LLP

(57) ABSTRACT

The packaging bag is a packaging bag made of a laminate formed in a bag shape, the laminate being composed of a paper substrate, a foamed sheet made of polyolefin resin laminated on an inner side relative to the paper substrate, and a sealant layer laminated on an inner side relative to the foamed sheet, which are laminated with the sealant layer facing inward. In the packaging bag, a thickness of the foamed sheet is in a range of 0.8 mm to 5.0 mm, an expansion ratio of the foamed sheet is in a range of 15 to 50 times, and a bending stiffness of the paper substrate in an MD direction is in a range of 150 mN to 700 mN.

19 Claims, 25 Drawing Sheets

(51) Int. Cl.
*B65D 33/20* (2006.01)
*B65D 75/58* (2006.01)
*B65D 33/18* (2006.01)
*B65D 30/08* (2006.01)
*B32B 5/18* (2006.01)
*B32B 7/12* (2006.01)
*B32B 27/06* (2006.01)
*B32B 27/10* (2006.01)
*B32B 27/32* (2006.01)

(52) U.S. Cl.
CPC .............. *B32B 27/10* (2013.01); *B32B 27/32* (2013.01); *B65D 31/02* (2013.01); *B65D 33/18* (2013.01); *B65D 33/20* (2013.01); *B65D 75/5827* (2013.01); *B65D 75/5844* (2013.01); *B65D 81/03* (2013.01); *B32B 2250/04* (2013.01); *B32B 2266/025* (2013.01); *B32B 2307/558* (2013.01); *B32B 2439/46* (2013.01); *B32B 2553/02* (2013.01)

(58) Field of Classification Search
CPC ... B32B 2439/46; B32B 2553/02; B32B 7/12; B32B 27/065; B32B 27/10; B32B 27/32; B32B 2250/04; B32B 2266/025; B32B 2307/558
USPC ........................................................ 206/523
See application file for complete search history.

(56) References Cited

U.S. PATENT DOCUMENTS

| | | | | |
|---|---|---|---|---|
| 6,437,048 | B1* | 8/2002 | Saito | C08F 10/00 525/240 |
| 6,841,106 | B1* | 1/2005 | Fujimaki | C08J 9/0023 264/102 |
| 2002/0023924 | A1* | 2/2002 | Wisniewski | B65D 33/18 220/359.1 |
| 2008/0220193 | A1* | 9/2008 | Tohi | C08F 10/00 428/36.92 |
| 2016/0001953 | A1* | 1/2016 | Chesworth | B65D 5/4266 229/103.2 |
| 2017/0327289 | A1* | 11/2017 | Hutter | B65D 75/30 |
| 2018/0141736 | A1* | 5/2018 | Bazbaz | B65D 31/02 |

FOREIGN PATENT DOCUMENTS

| | | |
|---|---|---|
| JP | S59-129770 U | 8/1984 |
| JP | S62-038836 | 3/1987 |
| JP | H01-137837 | 9/1989 |
| JP | H03-004583 U | 1/1991 |
| JP | H03-123843 U | 12/1991 |
| JP | H05-58649 U | 8/1993 |
| JP | H06-051139 | 7/1994 |
| JP | 3053606 U | 11/1998 |
| JP | 2000-177747 A | 6/2000 |
| JP | 2002-145277 A | 5/2002 |
| JP | 2005-088452 | 4/2005 |
| JP | 2005-091529 A | 4/2005 |
| JP | 2005-187969 | 7/2005 |
| JP | 2007-276194 | 10/2007 |
| JP | 2015-140188 A | 8/2015 |

OTHER PUBLICATIONS

Japanese Office Action dated Oct. 23, 2019 for corresponding Application No. 2015-251993.
International Search Report with English language translation and Written Opinion issued in International Application No. PCT/JP2016/086802 dated Mar. 7, 2017.

* cited by examiner

PACKAGING BAG

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/086802, filed on Dec. 9, 2016, which is based upon and claims the benefit of priority to Japan Priority Application No. 2015-242703, filed on Dec. 11, 2015; Japan Priority Application No. 2015-251993, filed on Dec. 24, 2015; the disclosures of which are all hereby incorporated herein by reference in their entireties.

TECHNICAL FIELD

The present invention relates to packaging bags.

BACKGROUND ART

Packaging bags having a cushioning function for protecting the contents from impact or the like are known in the logistics industry. As an example, PTL 1 discloses an envelope formed of kraft paper folded in half with the fold taken as the bottom of the envelope and both sides respectively adhered, and a plastic air bubble wrap sheet bonded to the inside of the envelop.
[Citation List] [Patent Literature] [PTL 1] JP-2002-145277 A

SUMMARY OF THE INVENTION

Technical Problem

In this technical field, in order to appropriately protect the contents from impact or the like, packaging bags made of a substrate such as kraft paper and a cushioning material have been provided. However, packaging bags made of general kraft paper and a plastic air bubble wrap sheet laminated thereon, when dropped with fragile contents such as a CD case, may fail to protect the contents from impact. Further, when a plastic air bubble wrap sheet is used as a cushioning material, the contents may have indentations made by the bubbles of the plastic air bubble wrap sheet. Accordingly, there is a demand for packaging bags that appropriately protect the contents from impact or the like without the bubbles causing indentations.

An object of the present invention is to provide packaging bags that attempt to better protect the contents.

Solution to Problem

A packaging bag according to one aspect of the present invention is a packaging bag made of a laminate formed in a bag shape, the laminate being composed of a paper substrate, a foamed sheet made of polyolefin resin laminated on an inner side relative to the paper substrate, and a sealant layer laminated on an inner side relative to the foamed sheet, which are laminated with the sealant layer facing inward, wherein a thickness of the foamed sheet is in a range of 0.8 mm to 5.0 mm, an expansion ratio of the foamed sheet is in a range of 15 to 50 times, and a bending stiffness of the paper substrate in an MD direction is in a range of 150 mN to 700 mN.

In this packaging bag, the foamed sheet has the thickness in the range of 0.8 mm to 5.0 mm and the expansion ratio in the range of 15 to 50 times, and the paper substrate laminated on the outer side relative to the foamed sheet has the bending stiffness in the range of 150 mN to 700 mN. With this configuration in which the paper substrate having the bending stiffness of 150 mN or more is laminated on the foamed sheet having a cushioning function and a predetermined thickness, the paper substrate is not easily collapsed when dropped in the MD direction, for example, to thereby reduce drop impact transferred to the contents. Besides, the impact which is not absorbed by the paper substrate will be absorbed by the foamed sheet having the above predetermined thickness and expansion ratio. In the conventional art in which a plastic air bubble wrap sheet is simply attached to general kraft paper as a cushioning material, the strength may be low as a packaging bag, which causes drop impact to be transferred to the contents. In the above-mentioned packaging bag, however, the contents can be appropriately protected. In addition, according to the configuration of the above packaging bag, a plastic air bubble wrap sheet is not provided on the inner surface. Accordingly, the contents do not have indentation made by the bubbles or the like. Moreover, when the paper substrate has the bending stiffness of more than 700 mN, processing of the laminate into a packaging bag will be laborious. Therefore, the paper substrate preferably has the bending stiffness of 700 mN or less. Further, the term "bending stiffness" as used herein refers to stiffness of the material expressed by a load applied when a sample, which has been cut with a predetermined width and length and formed in a loop shape, is pressed to collapse. The bending stiffness can be measured by using a measurement machine available on the market, for example, a loop stiffness tester.

In the above packaging bag, the expansion ratio of the foamed resin sheet may be in the range of 30 to 40 times. Further, the bending stiffness of the paper substrate in the MD direction may be in the range of 200 mN to 600 mN. With this configuration, drop impact is less likely to be transferred to the contents so that the contents can be more appropriately protected.

In the above packaging bag, the sealed section in which the sealant layers facing each other are sealed may be provided in at least part of the periphery of the packaging bag, and the impact absorption section may be formed of the laminate on the outer edge of the sealed section. In this case, since the impact absorption section is provided on the outer edge of the sealed section sealed section, drop impact is mitigated by the impact absorption section, which first comes into contact with the ground when the packaging bag is dropped with the sealed section downward. Accordingly, the contents can be attempted to be better protected.

Furthermore, in the above packaging bag, the impact absorption section may be the unsealed section formed on the outer edge of the sealed section, or the wavy section which is the outer edge of the sealed section formed in a wavy shape. In the unsealed section, since the sealant layers facing each other are not sealed to each other, high flexibility can be obtained compared with the sealed section fixed by sealing. Accordingly, impact can be better absorbed. Further, in the wavy section, which is formed of continuous projecting pieces and recessed pieces, the projecting pieces of the wavy section have high flexibility compared with a general sealed section which is linearly formed. Accordingly, impact can be appropriately absorbed.

The above packaging bag may include a main body formed in a bag shape with an opening; and a sealing section that seals the opening of the main body. In this case, perforations may be formed in the sealing section. The sealing section may have a tab which is formed by cutting the sealing section. The tab may extend from a center to an end of the sealing section in a width direction. The tab may be formed at a position spaced from the adhesion region to the main body side by 3 to 20 mm. The perforations may be formed continuously from the tab in the sealing section. A tear tape may be attached continuously from the tab in the sealing section. With this configuration, the packaging bag can be easily opened from the tab.

Further, either one of the main body and the sealing section may have an adhesion region that adheres the main body and the sealing section, and the adhesion region may be formed of a double-sided tape or an adhesive which does not permit re-attachment between the main body and the sealing section. With this configuration, the sealing section is prohibited from being re-attached when the packaging bag was tampered with.

In the above packaging bag, the thickness of the adhesion region may be 50 μm or more, and the adhesive that constitutes the adhesion region may be a synthetic rubber-based thermoplastic adhesive having viscosity at 140° C. of 50000 mPa·s or more. In this case, the adhesion region may have high adhesiveness in normal temperature. Further, since the adhesive contained in the adhesion region is a synthetic rubber-based thermoplastic adhesive (or a pressure sensitive adhesive), the adhesive tends to have high hardness. In the packaging bag using such an adhesive, the adhesive itself is less likely to be broken when the sealing section is opened. As a consequence, in opening of the packaging bag, at least part of either the main body or the sealing section to which the adhesive is adhered, instead of the adhesive, is delaminated and broken. Accordingly, in opening of the sealing section, evidence of opening is created on the packaging bag so that tampering can be prevented. In the above packaging bag, the adhesive may be a styrene-isoprene based thermoplastic adhesive. In this case, evidence of opening can be more reliably created on the packaging bag. The thickness of the adhesion region may be 100 μm or more.

The packaging bag may be formed in a pillow shape. With this configuration, a decrease in the volume ratio of the capacity to the outer volume of the packaging bag can be prevented. Further, the packaging bag may include a plurality of storage spaces. With this configuration, the contents stored in the respective storage spaces do not overlap each other.

Advantageous Effects of Invention

According to a packaging bag of the present invention, the contents can be attempted to be better protected.

BRIEF DESCRIPTION OF THE DRAWINGS

FIGS. 2A and 2B are plan views of a packaging bag according to a first embodiment of the present invention, in which FIG. 2A shows that a sealing section is open, and FIG. 2B shows that a sealing section is sealed.

FIGS. 5A and 5B are plan views of a first modification of the packaging bag according to the first embodiment, in which FIG. 5A shows that a sealing section is open, and FIG. 5B shows that a sealing section is sealed.

FIGS. 6A and 6B are plan views of a second modification of the packaging bag according to the first embodiment, in which FIG. 6A shows that a sealing section is open, and FIG. 6B shows that a sealing section is sealed.

FIGS. 21A and 21B are plan views of a packaging bag using the laminate shown in FIGS. 20A and 20B, in which FIG. 21A shows that a sealing section is open, and FIG. 21B shows that a sealing section is sealed.

FIGS. 24A and 24B are plan views of another embodiment of the packaging bag using the laminate shown in FIGS. 20A and 20B, in which FIG. 24A shows that a sealing section is open, and FIG. 24B shows that a sealing section is sealed.

DESCRIPTION OF REPRESENTATIVE EMBODIMENTS

With reference to the drawings, representative embodiments of the present invention will be described in detail. For the purpose of convenience, substantially the same elements are denoted by the same reference numbers, and the redundant description thereof may be omitted. In the following description, the thicknesses of the layers constituting a laminate are described based on the thicknesses after lamination. Further, it is to understood that these embodiments are intended to be representative of the present invention and that the present invention is not necessarily limited to the following embodiments.

First Embodiment

Figure 1:
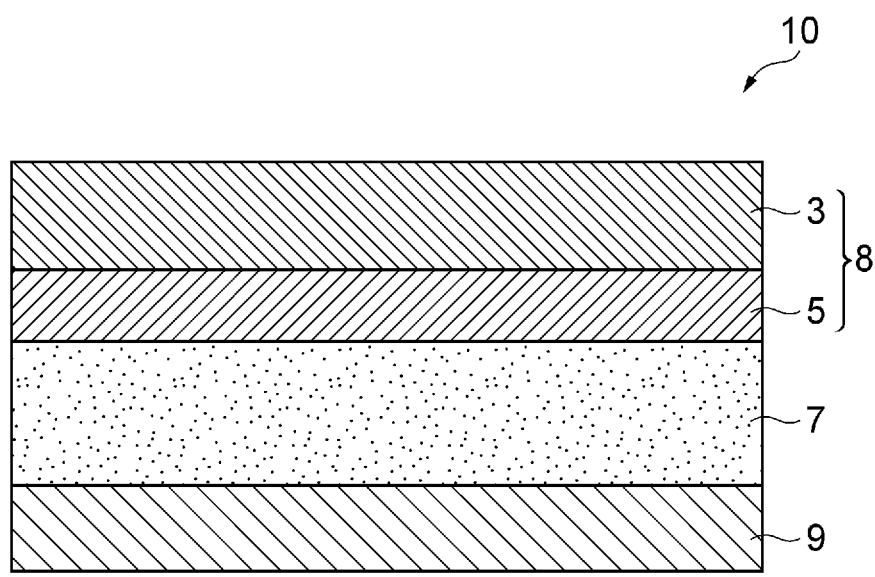
FIG. 1 is a schematic cross-sectional view that illustrates a structure of a laminate constituting a packaging bag according to an embodiment of the present invention.

FIG. 1 is a schematic cross-sectional view that illustrates a structure of a laminate 10 constituting a packaging bag according to the present embodiment. The laminate 10 includes a paper substrate 8 which includes a paper layer 3, a foamed sheet 7 laminated on an inner surface of the paper substrate 8, and a sealant layer 9 laminated on an inner surface of the foamed sheet 7. The paper substrate 8 includes the paper layer 3, which constitutes an outer surface of the packaging bag 1, and an adhesive layer 5 laminated on the paper layer 3. In the present embodiment, the adhesive layer 5 is made of polyethylene, for example. The paper substrate 8 has an MD direction (machine direction), which is a flow direction of the material according to production processes. The paper layer 3 and the adhesive layer 5, which constitute the paper substrate 8, have the MD direction in the same direction. A bending stiffness of the paper substrate 8 in the MD direction is in the range of 150 mN to 700 mN, and preferably in the range of 200 mN to 600 mN. Further, a thickness of the adhesive layer 5 is in the range of 5 to 40 μm, and a grammage of the entire paper substrate 8 including the paper layer 3 is in the range of 50 g/m² to 120 g/m², and more preferably in the range of 60 g/m² to 100 g/m². Further, a thickness of the paper substrate 8 is in the range of 50 to 250 μm. In addition, a peeling strength of the adhesive layer 5 may be higher than that of the paper layer 3 of the paper substrate 8. In this case, delamination fracture of the adhesive layer 5 is less likely to occur than tearing of the paper layer 3.

The material of the foamed sheet 7 is a polyolefin resin having cushioning characteristics, which may be, for example, polyethylene (PE) or polypropylene (PP). A thickness of the foamed sheet 7 is in the range of 0.8 mm to 5.0 mm, and preferably in the range of 0.8 to 2.5 mm in view of the volume ratio of the capacity to the outer volume and ease of production. An expansion ratio of the foamed sheet 7 is in the range of approximately 15 to 50 times, and preferably in the range of approximately 30 to 40 times. The expansion ratio is expressed as the density of resin before foaming/the density of resin after foaming. A peeling strength of the foamed sheet 7 may be higher than that of the paper layer 3 of the paper substrate 8. In this case, delamination fracture of the foamed sheet 7 is less likely to occur than the paper layer 3.

The sealant layer 9 is a layer having a portion to be thermally sealed when the laminate 10 is formed into a bag shape. A material for the sealant layer 9 may be, for example, linear low density polyethylene (LLDPE), high density polyethylene (HDPE), or the like. A thickness of the sealant layer 9 is, for example, in the range of 8 to 40 μm. The sealant layer 9 is an inner surface of the packaging bag 1 and a layer in contact with the contents. In the present embodiment, it is contemplated that the contents are slid into the packaging bag 1 which is pre-formed in a bag shape. Accordingly, in view of slipperiness of the contents, the sealant layer 9 is preferably made of HDPE, which is slippery.

Although the thicknesses of the respective layers in the laminate 10 are not specifically limited, the thickness of the laminate 10 can be reduced over the conventional one so that the volume ratio of the capacity to the outer volume of the packaging bag 1 can be improved.

The laminate 10 is produced, for example, by a method described below. First, the adhesive layer 5 is laminated on one surface of the sheet-shaped paper layer 3 by extruder processing such as extrusion lamination to thereby form the paper substrate 8. Further, the sheet-shaped sealant layer 9 is laminated on the foamed sheet 7 by thermal lamination. Then, the paper substrate 8 is laminated on the laminate of the foamed sheet 7 and the sealant layer 9 by thermal lamination. Thus, the laminate 10 having the paper layer 3, the adhesive layer 5, the foamed sheet 7, and the sealant layer 9, which are laminated in sequence is formed. The production method is not specifically limited, and the laminate 10 can also be formed by extruder processing to laminate the paper substrate 8 formed by extruder processing on the laminate of the foamed sheet 7 and the sealant layer 9 formed by thermal lamination. The laminate 10 can be formed into a bag after it is cut into a predetermined width by slit processing.

Figure 2A:
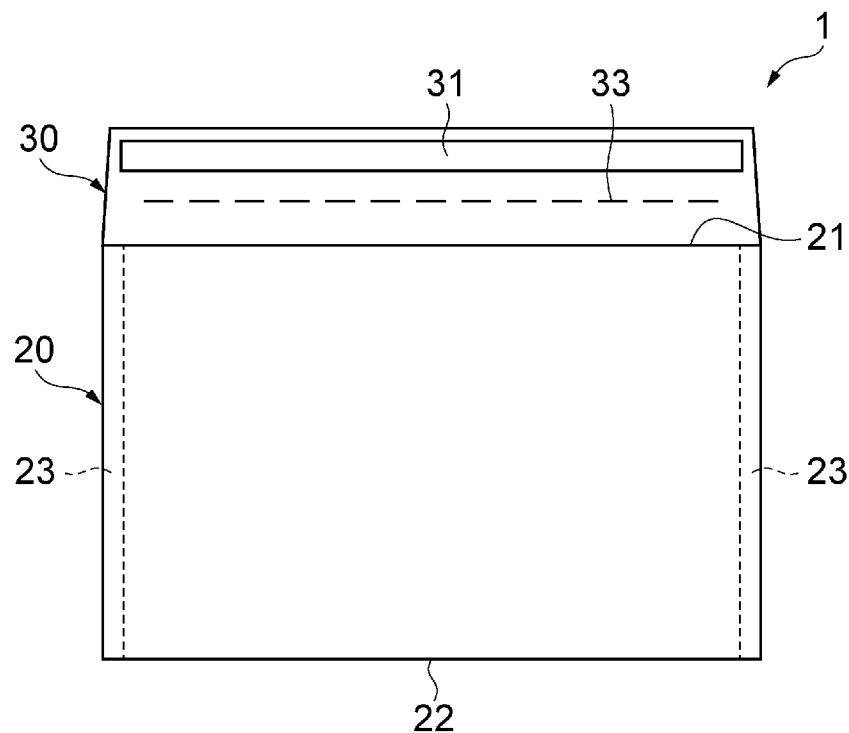
Figure 2B:
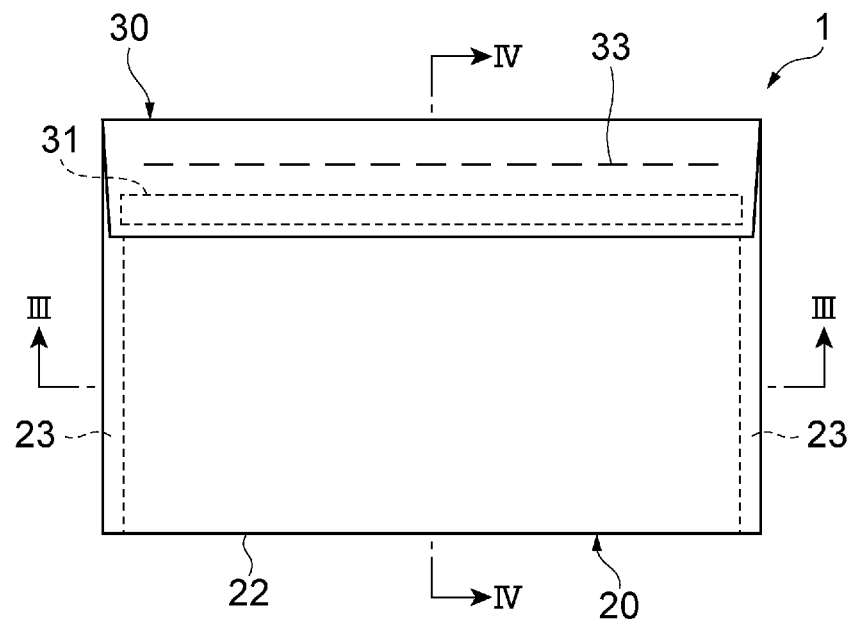
Figure 3:
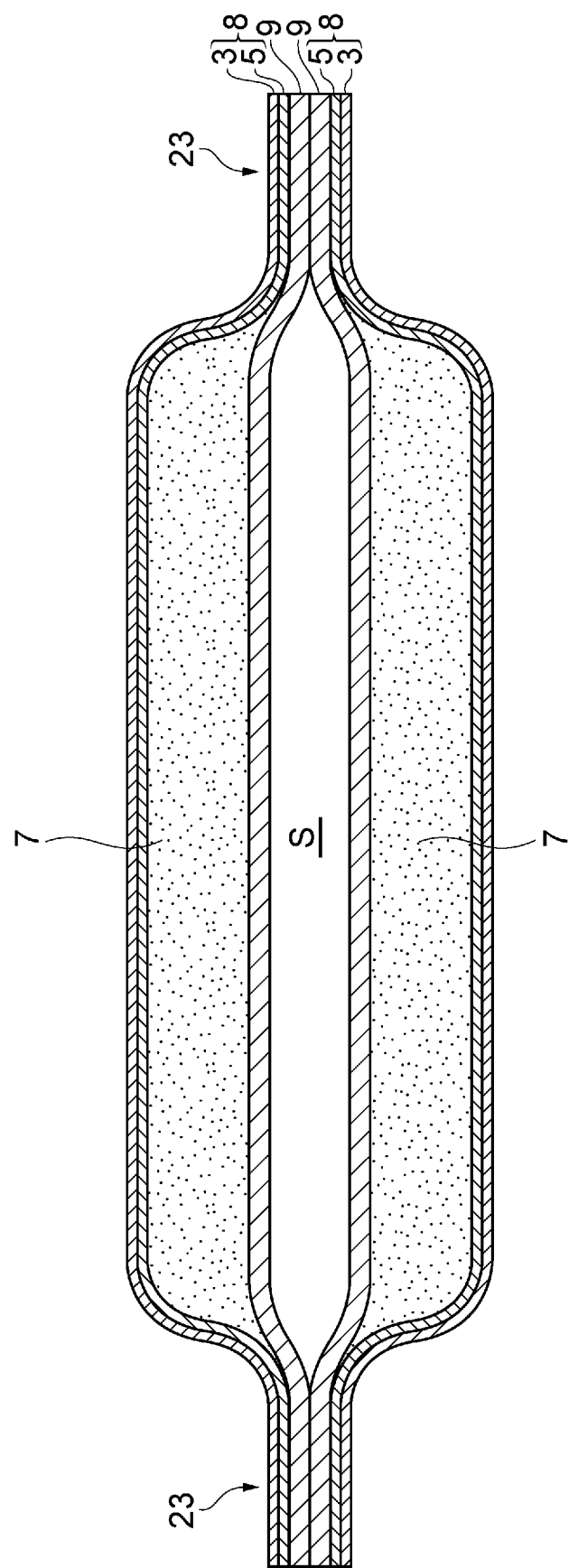
FIG. 3 is a cross-sectional view taken along the line III-III of FIG. 2B.
Figure 4:
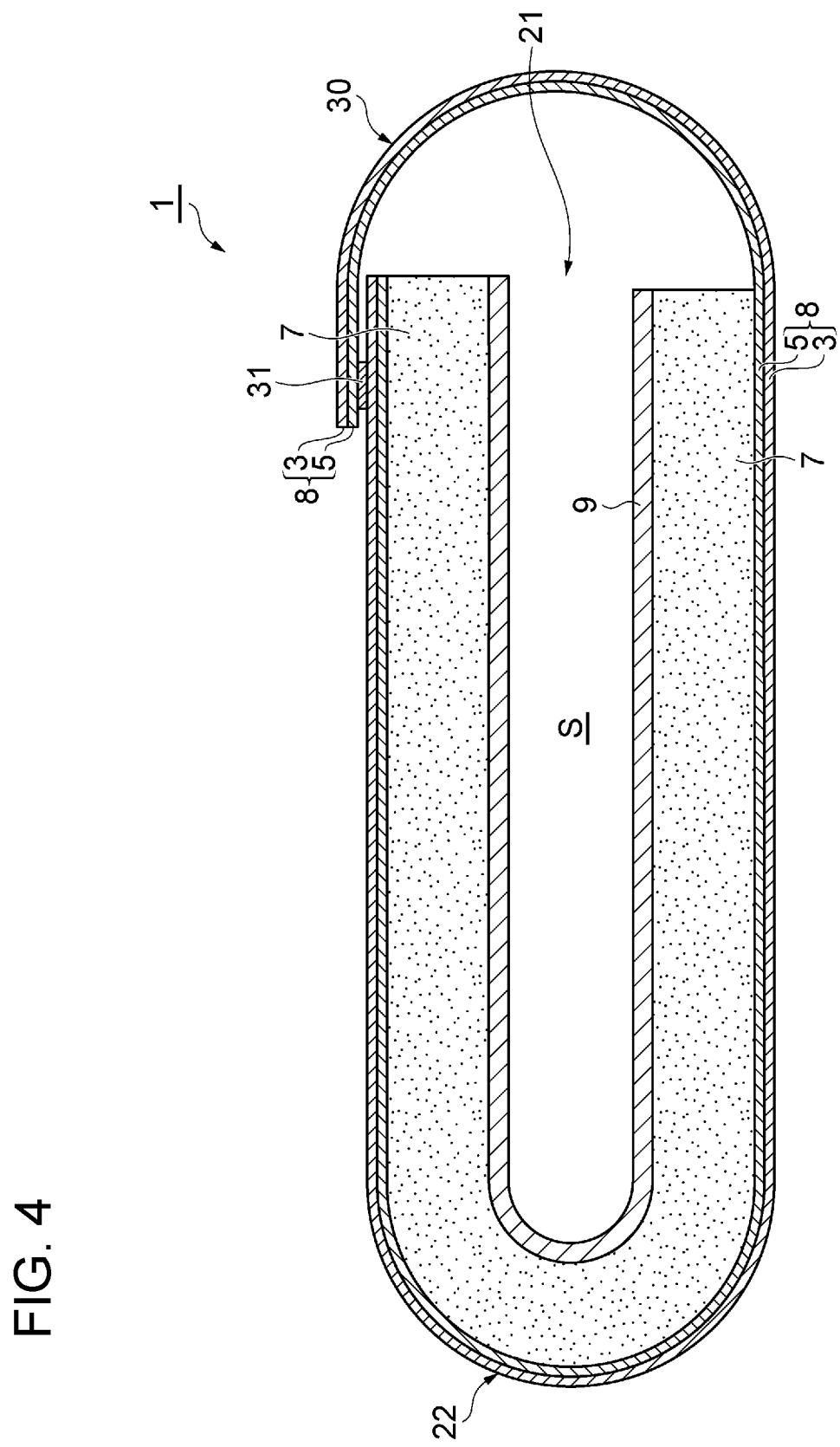
FIG. 4 is a cross-sectional view taken along the line IV-IV of FIG. 2B.

FIGS. 2A and 2B are plan views of the packaging bag 1 formed of the laminate 10. As shown in FIGS. 2A and 2B, the packaging bag 1, which has a substantially rectangular shape in plan view, includes a main body 20 formed in a bag shape with an opening 21, and a sealing section 30 for sealing the opening 21. The sealing section 30 is a cover (also referred to as a head or flap) that seals the packaging bag 1, and is integrally formed with the main body 20. In the following description, a direction in which the opening 21 extends is defined as a width direction, and a direction perpendicular to the width direction is defined as an opening direction. FIG. 3 is a cross-sectional view taken along the width direction of the packaging bag 1, and FIG. 4 is a cross-sectional view taken along the opening direction of the packaging bag 1. In the illustrated example, a side of the packaging bag 1 which is opposite to the opening 21 is folded to form a folded section 22. Further, sealed sections 23 are formed on both sides of the packaging bag 1 in the width direction. In the sealed section 23, the sealant layers 9 facing each other are thermally sealed along the opening direction. Thus, the folded section 22 and the sealed sections 23 are formed to thereby define an inner space S in the packaging bag 1 (see FIGS. 3 and 4).

As shown in FIG. 4, the sealing section 30 is formed by the paper substrate 8 extending from the laminate 10 to the outside of the opening 21. Although the sealing section may also be formed by the laminate 10, the sealing section, when formed by only the paper substrate 8, can be reduced in thickness. The sealing section 30 can be folded over to cover the opening 21. The sealing section 30 has an adhesion region 31 which extends in the width direction. The adhesion region 31 may be made of a double-sided tape or an adhesive that is prevented from being re-attached to the main body 20. With this configuration, the sealing section 30 is prevented from being re-attached when the packaging bag 1 has been tampered with. Examples of an adhesive prevented from being re-attached include a hot melt adhesive.

The above packaging bag 1 is produced, for example, by a method described below. First, the elongated laminate 10 is formed by laminating the elongated laminate of the foamed sheet 7 and the sealant layer 9 fed out from a roll on the elongated paper substrate 8 fed out from a roll. In the present embodiment, the foamed sheet 7 and the sealant layer 9 are not laminated in the sealing section 30. Accordingly, the laminate of the foamed sheet 7 and the sealant layer 9 are laminated, leaving a predetermined area unlaminated from one end edge of the paper substrate 8 in the direction perpendicular to the longitudinal direction. Then, the laminate 10 is folded in the direction perpendicular to the longitudinal direction. Here, the sealant layer 9 of the laminate 10 faces inward. Then, in the laminate 10 thus folded, a portion of the sealant layer 9 corresponding to the sealed section 23 is thermally sealed in the direction perpendicular to the longitudinal direction (opening direction of the packaging bag). Thus, bag-shaped portions are continuously formed in the laminate 10. Subsequently, the bag-shaped portions continuously formed are separated at positions of the thermal seal, to thereby obtain the packaging bag 1. The adhesion region 31 may be formed in the sealing section 30 in any of the above steps. This production method is not specifically limited. For example, the sealant layer 9 may be thermally sealed after the laminate 10 is cut.

In the present embodiment, the MD direction of the paper substrate 8, the foamed sheet 7, and the sealant layer 9 corresponds to the width direction of the packaging bag 1, and the adhesion region 31 extends in the MD direction. Further, for ease of opening along the adhesion region 31, perforations 33 are formed in the sealing section 30. The perforations 33 are formed at positions spaced from the adhesion region 31 to the main body 20 side by a distance of 3 to 20 mm when the sealing section 30 is unsealed. Accordingly, by cutting the sealing section 30 along the perforations 33, the packaging bag 1 can be easily opened.

As described above, in the packaging bag 1 according to the present embodiment, the foamed sheet 7 has the thickness in the range of 0.8 mm to 5.0 mm and the expansion ratio in the range of 15 to 50 times, and the paper substrate 8 disposed on the outer side relative to the foamed sheet 7 has the bending stiffness in the range of 150 mN to 700 mN. Accordingly, due to the synergy of the paper substrate 8 having the bending stiffness of 150 mN or more and the foamed sheet 7 laminated on the paper substrate 8, the paper substrate 8 is not easily collapsed, for example, when dropped in the MD direction and the drop impact is less likely to be transferred to the contents. Besides, the impact which is not absorbed by the paper substrate 8 will be absorbed by the foamed sheet 7 having the thickness of 0.8 mm to 5.0 mm and the expansion ratio of 15 to 50 times.

In the conventional art in which a plastic air bubble wrap sheet is attached to a general kraft paper as a cushioning material, for example, when a plastic air bubble wrap sheet is simply attached to the substrate having the bending stiffness of approximately 140 to 160 mN, the strength may be low as a packaging bag, which causes drop impact to be transferred to the contents. However, in the packaging bag 1 of the present embodiment, which uses the above configuration, the contents can be appropriately protected and do not have indentation made by the bubbles or the like.

Figure 5A:
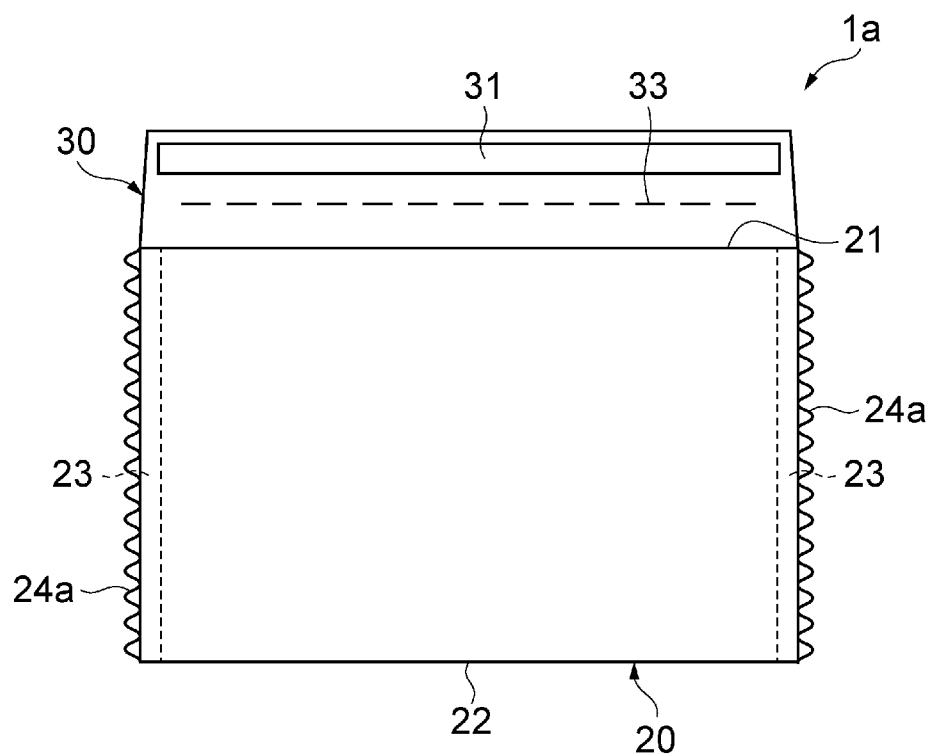
Figure 5B:
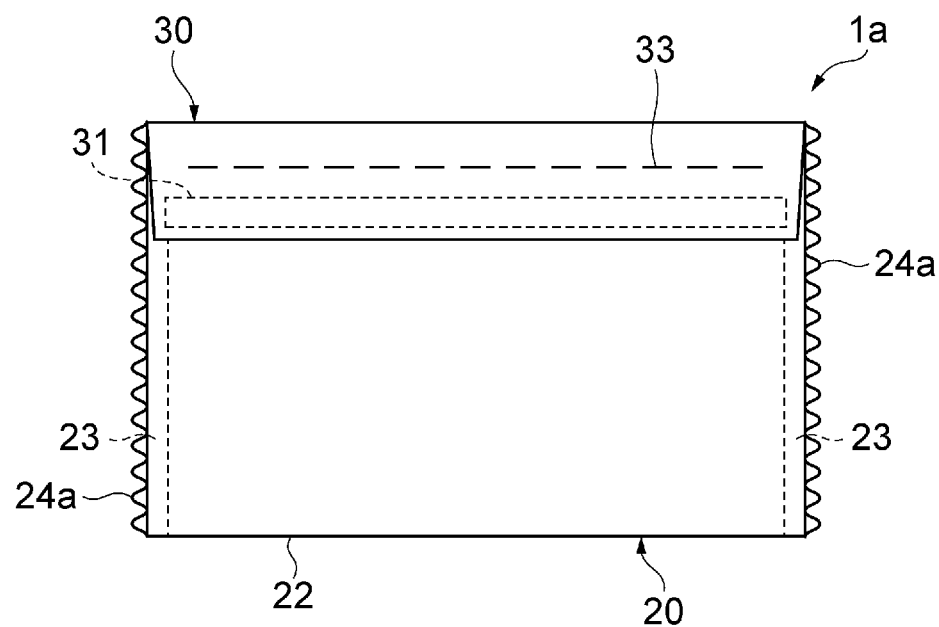

Referring now to FIGS. 5A, 5B, 6A, and 6B, a first modified example and a second modified example of the packaging bag according to the first embodiment will be described. FIGS. 5A and 5B are plan views of a packaging bag 1a of the first modified example formed of the laminate 10. With reference to FIGS. 5A and 5B, the packaging bag 1a, as with the packaging bag 1, includes a main body 20 formed in a bag shape with an opening 21, and a sealing section 30 for sealing the opening 21. In the packaging bag 1a, sealed sections 23 are formed on both sides in the width direction. Further, an impact absorption section is formed on the outer edge of the sealed section 23, extending from one end to the other end in the opening direction. The impact absorption section mitigates drop impact or the like on both end edges in the width direction of the packaging bag 1a. The impact absorption section in the present embodiment is formed of, for example, a wavy section 24a. That is, the outer edge of the sealed section 23 is formed in a wavy shape which extends outward in the width direction at a regular interval along the opening direction. The size of the wavy form is not specifically limited. For example, the height and pitch of the wave shapes in the wavy section 24a are 2 mm and 8 mm, respectively. The wavy section 24a is softer than the sealed section 23, and can efficiently absorb impact.

The packaging bag 1a having the above wavy section 24a can be formed, for example, by cutting the thermally heated portion into the wavy shape in production process of the above packaging bag 1 to thereby form a predetermined impact absorption section.

Figure 6A:
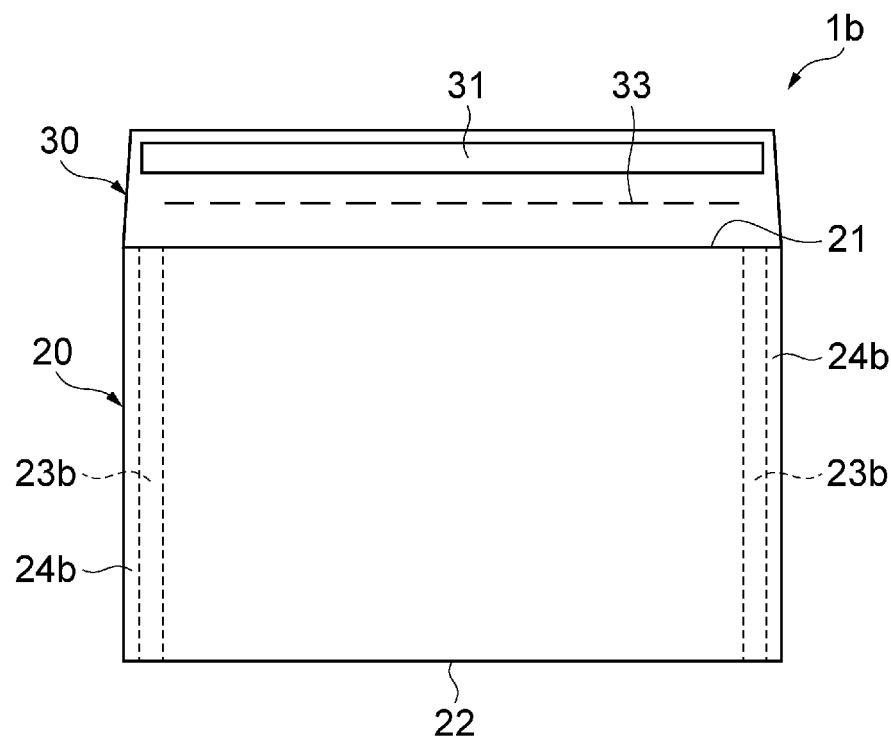
Figure 6B:
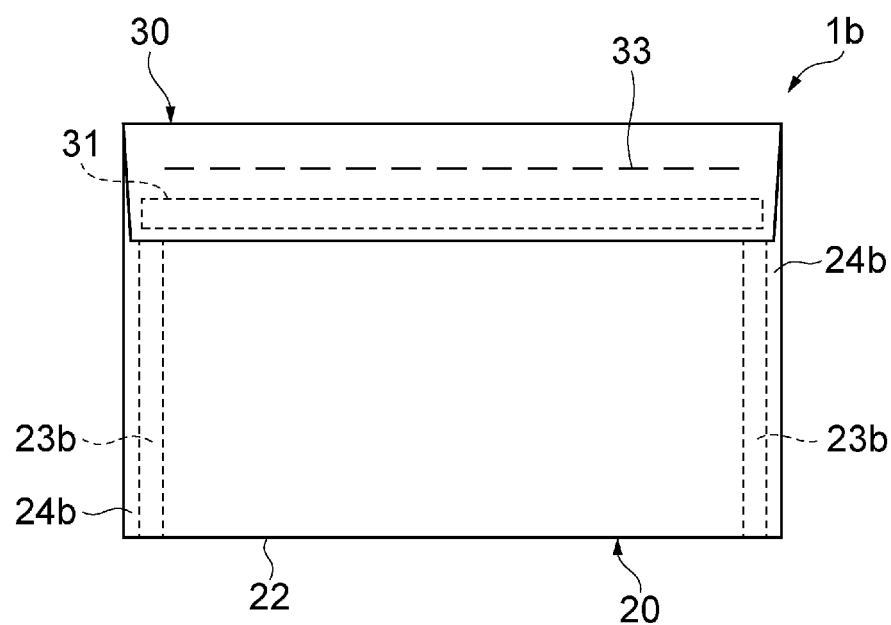

Further, FIGS. 6A and 6B are plan views of a packaging bag 1b of the second modified example formed of the laminate 10. With reference to FIGS. 6A and 6B, the packaging bag 1b, as with the packaging bag 1, includes a main body 20 formed in a bag shape with an opening 21, and a sealing section 30 for sealing the opening 21. In the packaging bag 1b, sealed sections 23b are formed on both sides in the width direction. The impact absorption section in this modified example is provided by an unsealed section 24b. In the unsealed section 24b, the sealant layers 9 facing each other are not sealed at the outer edge, and the laminates 10 face each other (see the unsealed section 24d in FIG. 25). That is, the sealed section 23b is disposed slightly inward from the outer edge of the packaging bag 1b. Therefore, the unsealed section 24b has flexibility compared with the sealed section 23 of the packaging bag 1 to thereby efficiently absorb impact. As an example, the length in the width direction of the sealed section 23b is 10 mm, and the length in the width direction of the unsealed section 24b is 5 mm.

The packaging bag 1b is formed by the same method as that of the packaging bag 1a of the modified example. According to the above production method, the packaging bags 1a are continuously formed, the sealed section 23b of one packaging bag 1b and the sealed section 23b of the subsequent packaging bag 1b are adjacent to each other with their unsealed sections 24b interposed therebetween. That is, an unsealed portion between the sealed sections 23b is cut to thereby form the impact absorption section (unsealed section 24b).

According to the packaging bag 1a and 1b, since the impact absorption section formed of the wavy section 24a or the unsealed section 24b is provided on the outer edge of the sealed section 23, drop impact is mitigated by the impact absorption section, which first comes into contact with the ground when the packaging bags 1a and 1b are dropped with the sealed section 23 downward. Further, in the packaging bags 1a and 1b, since the paper substrate 8 has the bending stiffness in the range of 150 mN to 700 mN and the foamed sheet 7 has the predetermined thickness and the expansion ratio as described above, the impact which is not absorbed by the impact absorption section formed of the wavy section 24a or the unsealed section 24b is prevented from being easily transferred to the contents by virtue of the paper substrate 8 and the foamed sheet 7. Therefore, accordingly to the packaging bags 1a and 1b of this modified example, the contents in the packaging bag can be more reliably protected.

Further, in the wavy section 24a of the packaging bag 1a according to the modified example, which is formed by continuous projecting pieces and recessed pieces, the projecting pieces have high flexibility compared with a general sealed section 23. Further, the unsealed section 24b of the packaging bag 1b according to the modified example, which has an unsealed portion in the sealant layers 9 facing each other on the outer edge of the packaging bag 1b, is configured to have high flexibility compared with a typical sealed section 23. Therefore, these impact absorption sections can effectively absorb impact.

Second Embodiment

A packaging bag 101 according to the present embodiment differs from the packaging bag 1 of the first embodiment in that the laminate 10 is formed in a pillow shape. The following provides a description mainly of the differences from the first embodiment. The elements and components that are the same as those of the first embodiment are referred to by the same reference numbers, and detailed description thereof will be omitted.

Figure 7:
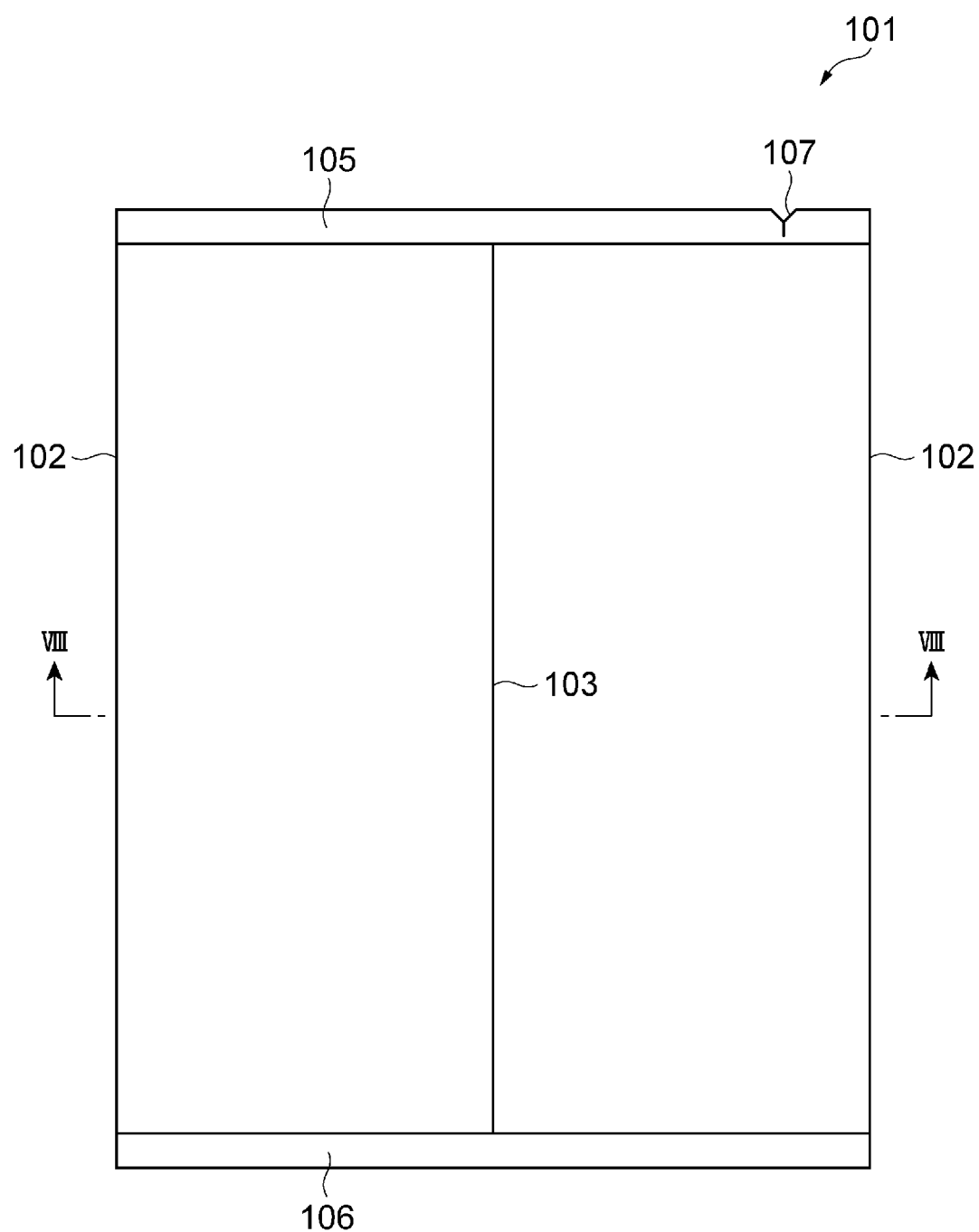
FIG. 7 is a plan view of a packaging bag according to a second embodiment of the present invention.
Figure 8:
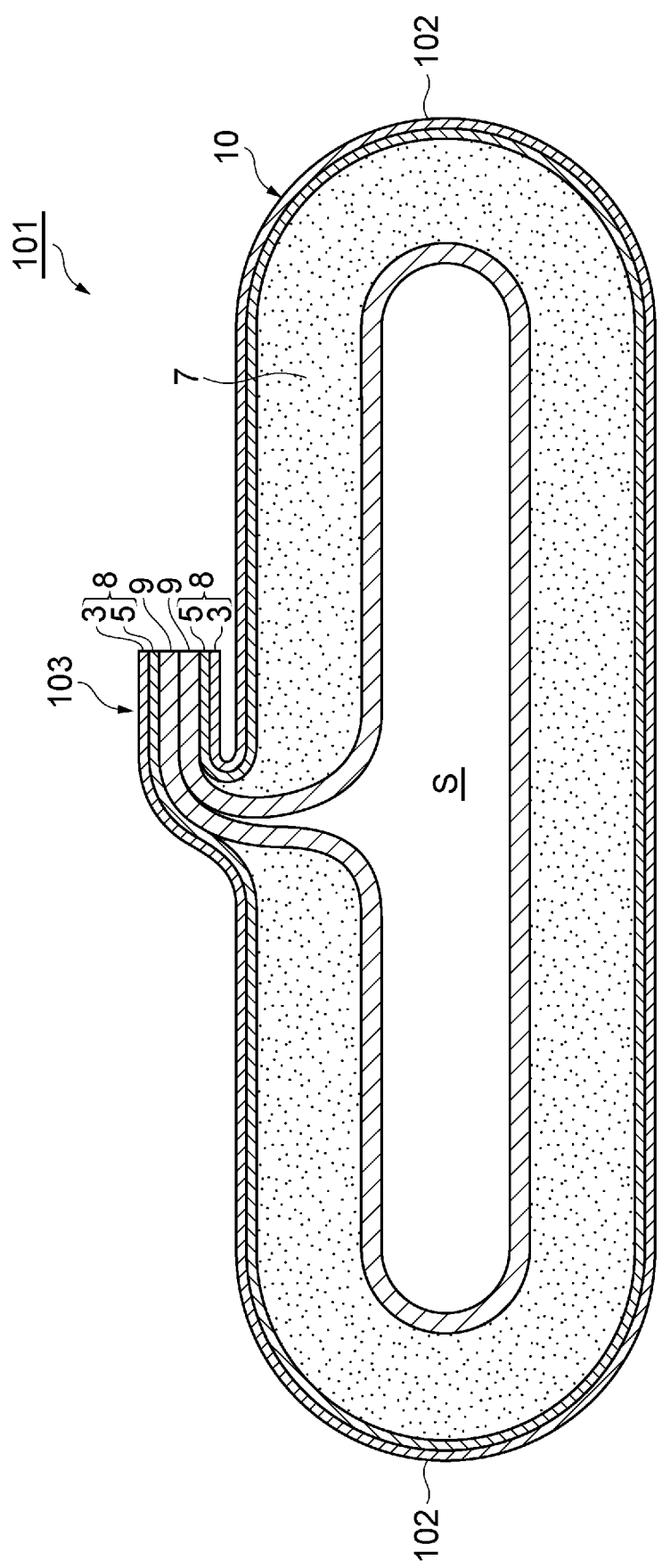
FIG. 8 is a cross-sectional view taken along the line VIII-VIII of FIG. 7.

As shown in FIGS. 7 and 8, the packaging bag 101 is a bag body formed of the laminate 10 in a pillow shape with the sealant layer 9 facing inward (the paper layer 3 facing outward). The packaging bag 1 is in a substantially rectangular shape in plan view. The term "pillow shape" as used herein refers to a shape in which a pair of opposing two sides are folded over, and the ends of these folded over portions are sealed to each other. In the illustrated example, both end sides 102 of the packaging bag 101 in the width direction are folded over, and the ends of these folded over portions form a sealed section 103. In the sealed section 103, both ends are thermally sealed to each other in the longitudinal direction at a center of the packaging bag 101 in the width direction. The present embodiment shows the packaging bag 101 in a sealed state. Both ends of the packaging bag 101 in the longitudinal direction are sealed sections 105 and 106, which are each thermally sealed. Thus, an inner space S is formed in the packaging bag 101.

At the sealed sections 103 in the laminate 10, the sealant layers 9 are thermally sealed to each other in the state of being laminated facing each other (see FIG. 8). This packaging form is performed by a pillow packaging machine, which uses the laminate 10 in a roll shape to wrap the contents in a continuous manner. In this case, the laminate 10 is formed into a package with the contents placed on the sealant layer 9. Accordingly, in view of slipperiness of the contents, the sealant layer 9 is preferably made of LLDPE, which is less slippery than HDPE. Further, in this production method, the longitudinal direction of the sealed section 103 corresponds to the MD direction of the laminate 10.

The sealed section 105 has a notch (start point of cutting) 107 (see FIG. 7). In the present embodiment, the notch 107 is formed on one end of the sealed section 105 in the width direction. As a result, since the opening direction by the notch 107 corresponds to the MD direction of the laminate 10, the packaging bag 101 can be easily opened. Further, the contents contained in the inner space S are prevented from being damaged when the packaging bag 1 is opened. In the illustrated example, the notch 107 is shown as a Y notch formed in Y-shape. However, the notch 17 is not limited to the Y notch, and may be an I notch or the like.

In the packaging bag 101 formed as a pillow shape as described above, the same effects as those of the packaging bag 1 of the first embodiment can be achieved. In addition, a decrease in the volume ratio of the capacity to the outer volume of the packaging bag 101 can be prevented.

Figure 9:
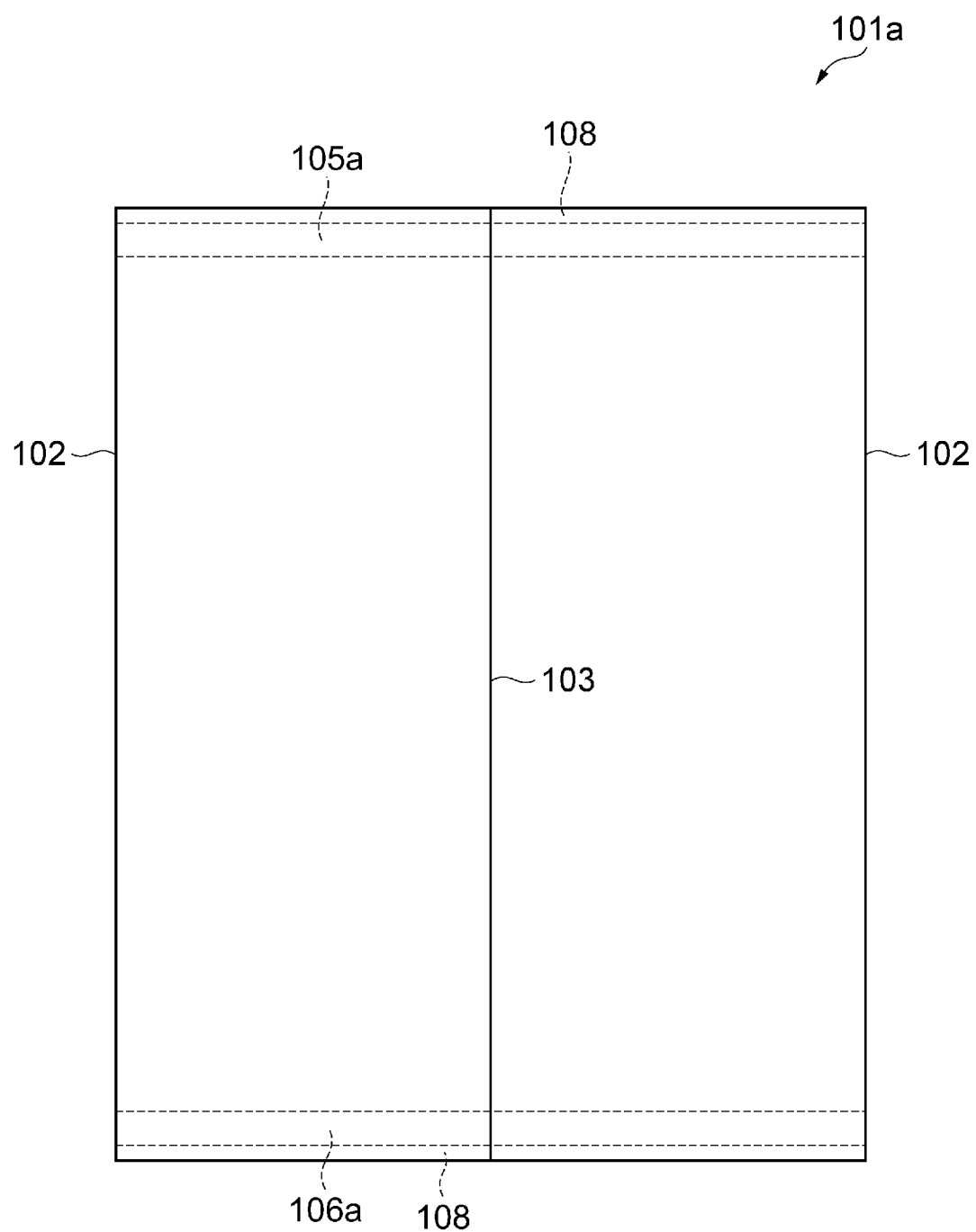
FIG. 9 is a plan view of a modification of the packaging bag according to the second embodiment.

Referring now to FIG. 9, a modified example of the packaging bag according to a second embodiment will be described. FIG. 9 is a plan view of a packaging bag according to the second embodiment of the present invention. As shown in FIG. 9, a packaging bag 101*a* is a bag body formed of the laminate 10 in a pillow shape with the sealant layer 9 facing inward as with the packaging bag 101. The packaging bag 101*a* is in a substantially rectangular shape in plan view. In the illustrated example, an impact absorption section is formed on the outer edge of the sealed section 105*a* and 106*a* in the width direction. The impact absorption section of the present embodiment is formed of an unsealed section 108 as with the second modified example of the first embodiment. That is, in the unsealed section 108, the sealant layers 9 of the laminates 10 facing each other are not thermally sealed.

In this packaging bag 101*a*, the same effects as those of the packaging bag 101 can be achieved. In addition, as with the modified example of the first embodiment, drop impact is mitigated by the impact absorption section (unsealed section 108), which first comes into contact with the ground when the packaging bag 101*a* is dropped with the sealed sections 105*a* and 106*a* downward, to thereby appropriately protect the contents. Moreover, instead of the unsealed section 108, the impact absorption section having a configuration such as the wavy section 24*a* can also be provided in the packaging bag 101.

Third Embodiment

A packaging bag 201 according to the present embodiment is the same as the first embodiment in that it is formed of the laminate 10, but differs from the packaging bag 1 of the first embodiment in that it has a plurality of inner spaces. The following provides a description mainly of the differences from the first embodiment. The elements and components that are the same as those of the first embodiment are referred to by the same reference numbers, and detailed description thereof will be omitted.

Figure 10:
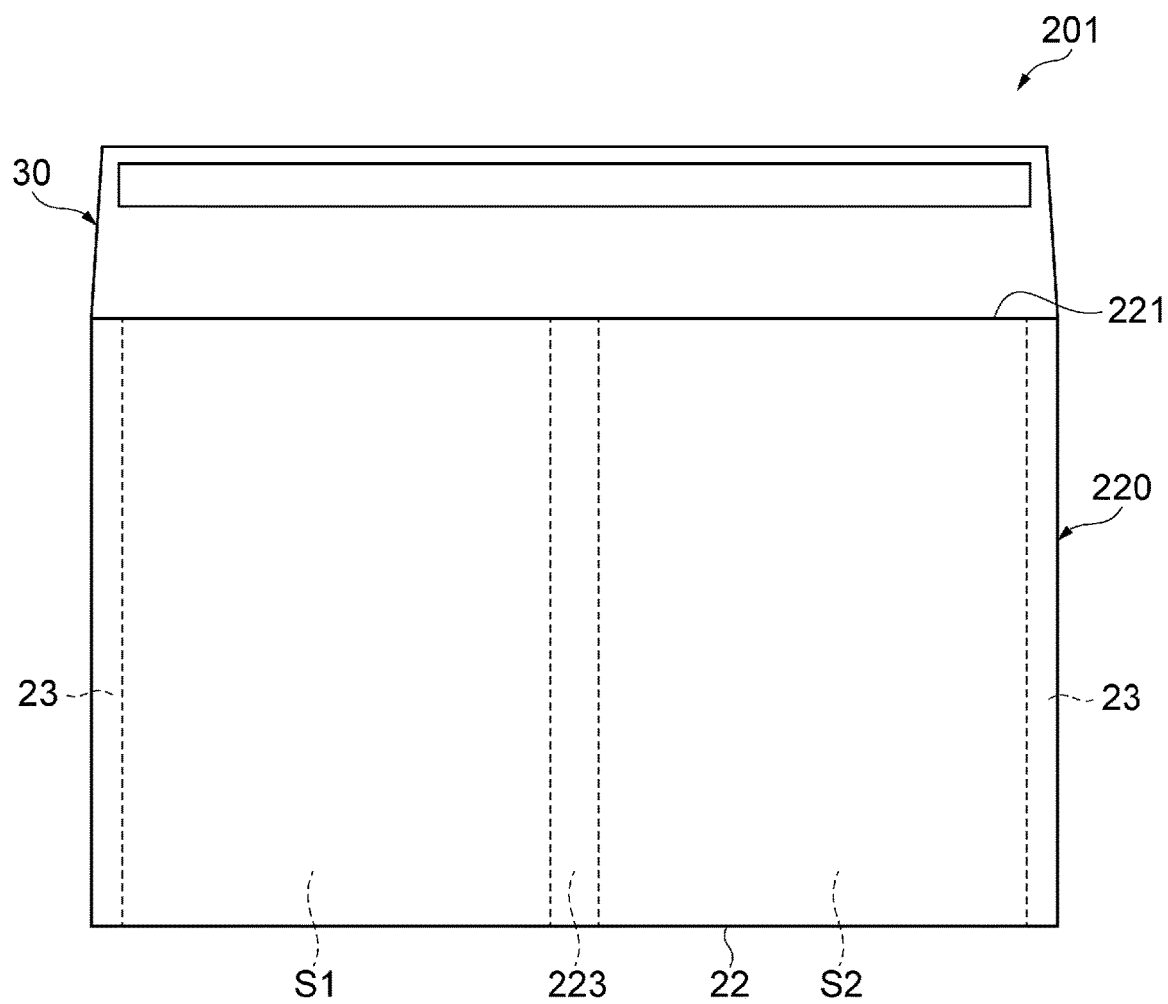
FIG. 10 is a plan view of a packaging bag according to a third embodiment of the present invention.

As shown in FIG. 10, the packaging bag 201 includes a main body 220 formed in a bag shape with an opening 221, and a sealing section 30 for sealing the opening 221. The packaging bag 201 has a substantially rectangular shape in plan view. In the packaging bag 201, a side opposite to the opening 221 is folded to form a folded section 22. Further, sealed sections 23 are formed on both sides of the packaging bag 201 in the width direction. A sealed section 223 is formed at the center in the width direction of the main body 220 so as to extend in the opening direction. In the sealed section 223, the sealant layers 9 facing each other are thermally sealed as with the sealed section 23. Accordingly, inner spaces S1 and S2 are formed as two storage spaces in the main body of the packaging bag 201. Since the inner space S1 and the inner space S2 are separated by the sealed section 223, the contents in the inner space S1 and the contents in the inner space S2 do not overlap each other. Further, the packaging bag 201 has the same effects as those of the packaging bag 1 of the first embodiment.

Figure 11:
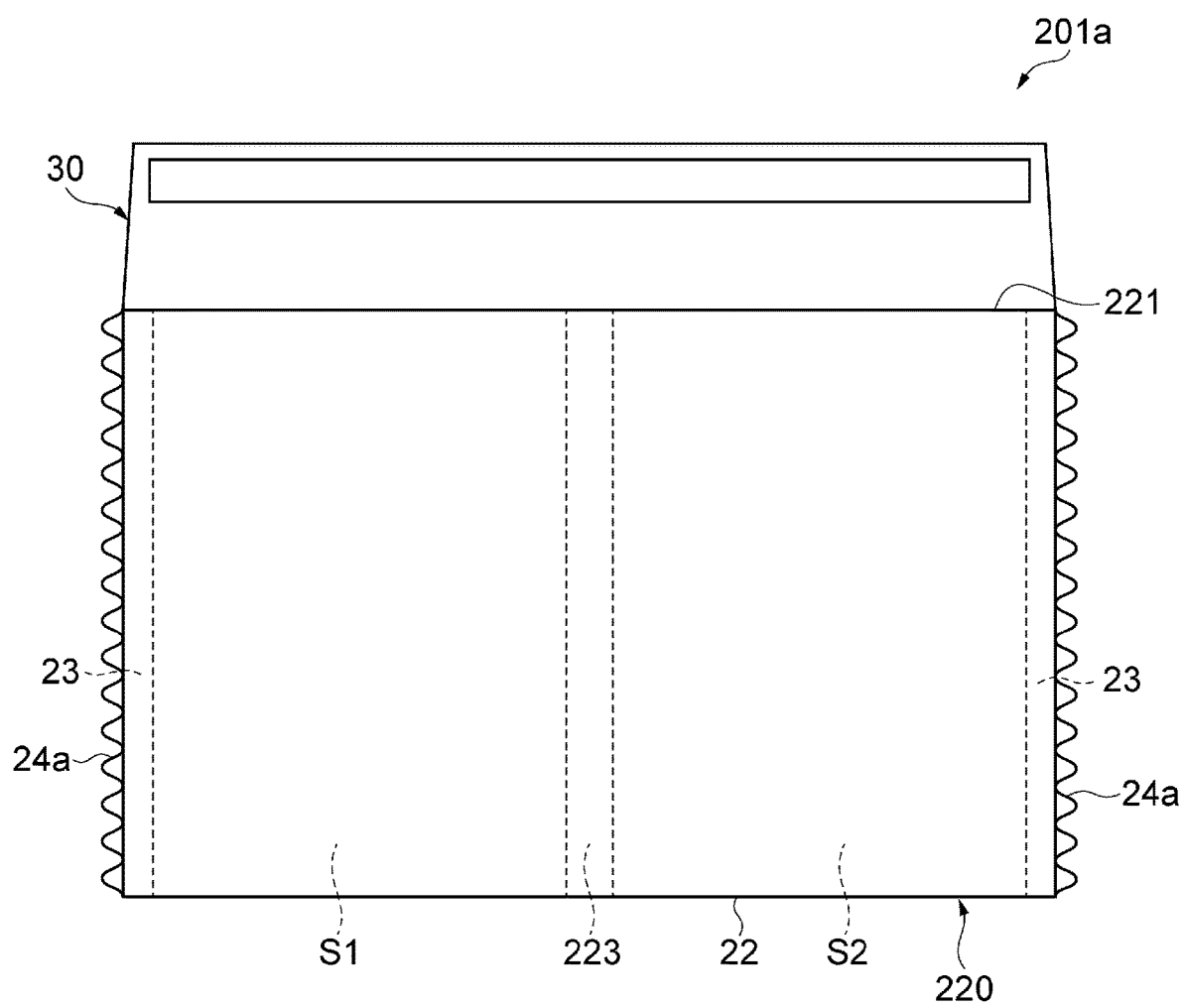
FIG. 11 is a plan view of a modification of the packaging bag according to the third embodiment of the present invention.

In the packaging bag of the present embodiment, as shown in FIG. 11, the wavy section 24*a* which is the impact absorption section can be provided on the end of the packaging bag 201*a* as with the modified example of the first embodiment. Accordingly, drop impact can be mitigated by the wavy section 24*a* absorbing an impact to the packaging bag 201*a* to thereby appropriately protect the contents. Further, the unsealed section 24*b* may be provided as the impact absorption section instead of the wavy section 24*a*.

Fourth Embodiment

A packaging bag 301 according to the present embodiment is the same as the first embodiment in that it is formed of the laminate 10, but differs from the packaging bag 1 of the first embodiment in that it has a tab in the sealing section.

The following provides a description mainly of the differences from the first embodiment. The elements and components that are the same as those of the first embodiment are referred to by the same reference numbers, and detailed description thereof will be omitted.

Figure 12:
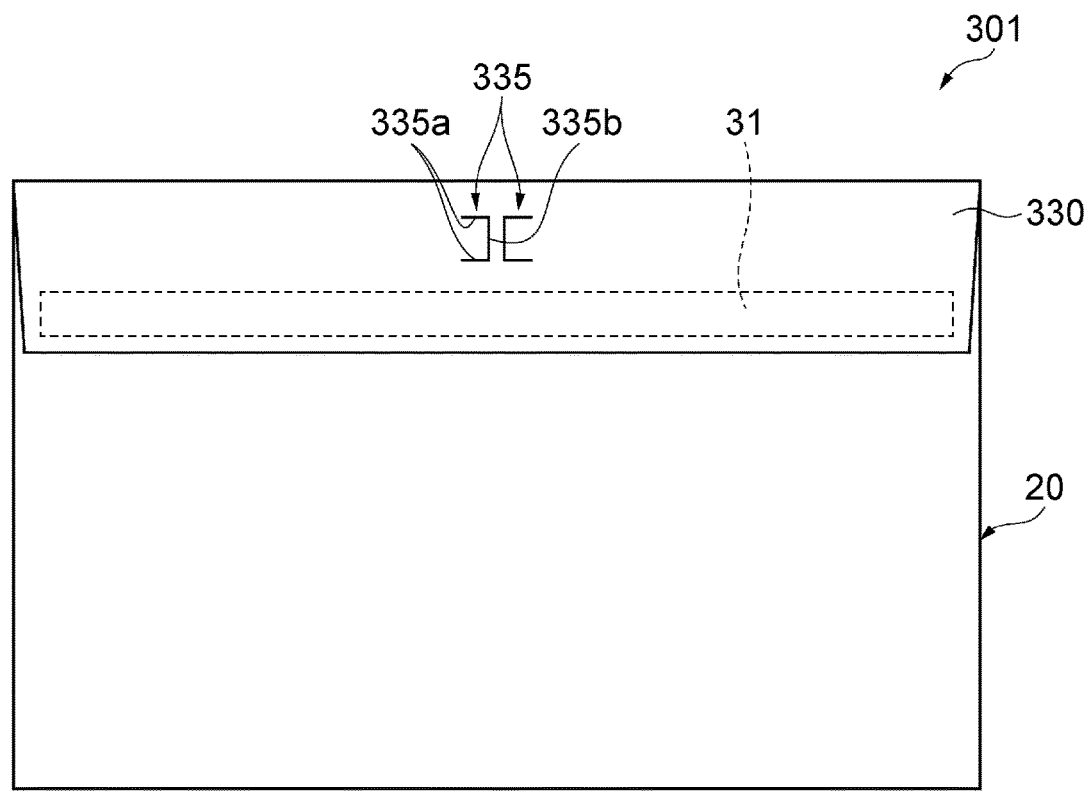
FIG. 12 is a plan view of a packaging bag according to a fourth embodiment of the present invention.

As shown in FIG. 12, the packaging bag 301 includes a main body 20 and a sealing section 330, and has a substantially rectangular shape in plan view. Two tabs 335, which are formed by cutting the sealing section 330, are provided at the center in the width direction of the sealing section 330. The tab 335 has two cutting lines 335a which are spaced in the opening direction and extend in the width direction and a cutting line 335b which connects the ends of the cutting line 335a. The tab 335 is formed to extend from the center to the end in the width direction of the sealing section 330. The direction in which the tab 335 extends corresponds to the MD direction of the laminate 10. The tab 335 is provided at a position spaced from the adhesion region 31 to the proximal end side of the sealing section 330 by 3 to 20 mm. A user can easily open the packaging bag 301 sealed by the adhesion region 31 by pulling the tab 335 of the packaging bag 301 in the width direction. Further, the packaging bag 301 has the same effects as those of the packaging bag 1 of the first embodiment.

Figure 13:
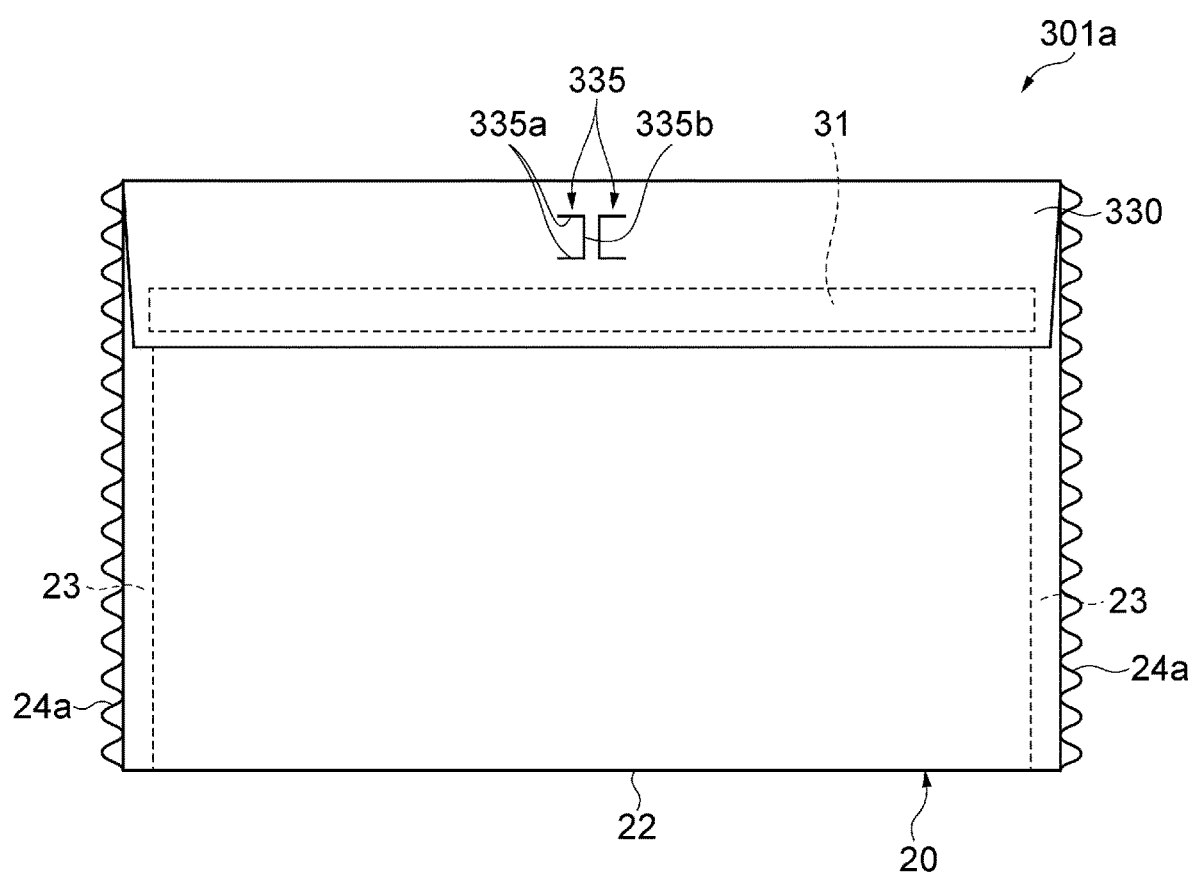
FIG. 13 is a plan view of a modification of the packaging bag according to the fourth embodiment of the present invention.

In the packaging bag of the present embodiment, as shown in FIG. 13, the wavy section 24a which is the impact absorption section can be provided on the end of the packaging bag 301a as with the modified example of the first embodiment. Accordingly, drop impact can be mitigated by the wavy section 24a absorbing an impact to the packaging bag 301a to thereby appropriately protect the contents. Further, the unsealed section 24b may be provided as the impact absorption section instead of the wavy section 24a.

Fifth Embodiment

A packaging bag 401 according to the present embodiment differs from the packaging bag 301 of the fourth embodiment in that it has perforations in the sealing section. The following provides a description mainly of the differences from the fourth embodiment. The elements and components that are the same as those of the first embodiment are referred to by the same reference numbers, and detailed description thereof will be omitted.

Figure 14:
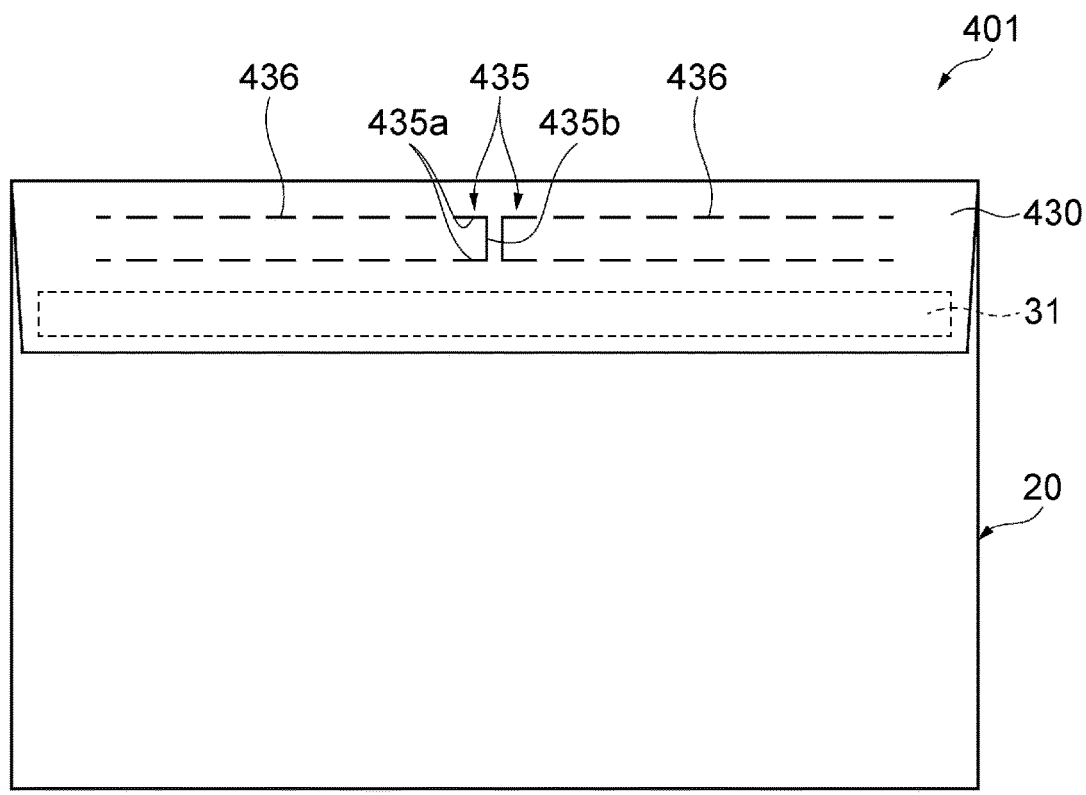
FIG. 14 is a plan view of a packaging bag according to a fifth embodiment of the present invention.

As shown in FIG. 14, the packaging bag 401 includes a main body 20 and a sealing section 430, and has a substantially rectangular shape in plan view. Two tabs 435 are provided at the center in the width direction of the sealing section 430. The tab 435 has two cutting lines 435a which are spaced in the opening direction and extend in the width direction and a cutting line 435b which connects the ends of the cutting line 435a. The tab has perforations which extend from the cutting line 435a to the end in the width direction of the sealing section 430. That is, the sealing section 430 has perforations 436 which are continuous from the cutting line 435a of the tab 435. The direction in which the tab 435 and the perforations 436 extend corresponds to the MD direction of the laminate 10. The tab 435 and the perforations 436 are provided at a position spaced from the adhesion region 31 to the proximal end side of the sealing section 430 by 3 to 20 mm. A user can easily open the packaging bag 401 sealed by the adhesion region 31 by pulling the tab 435 of the packaging bag 401 in the width direction. Further, the packaging bag 401 has the same effects as those of the packaging bag 1 of the first embodiment.

Figure 15:
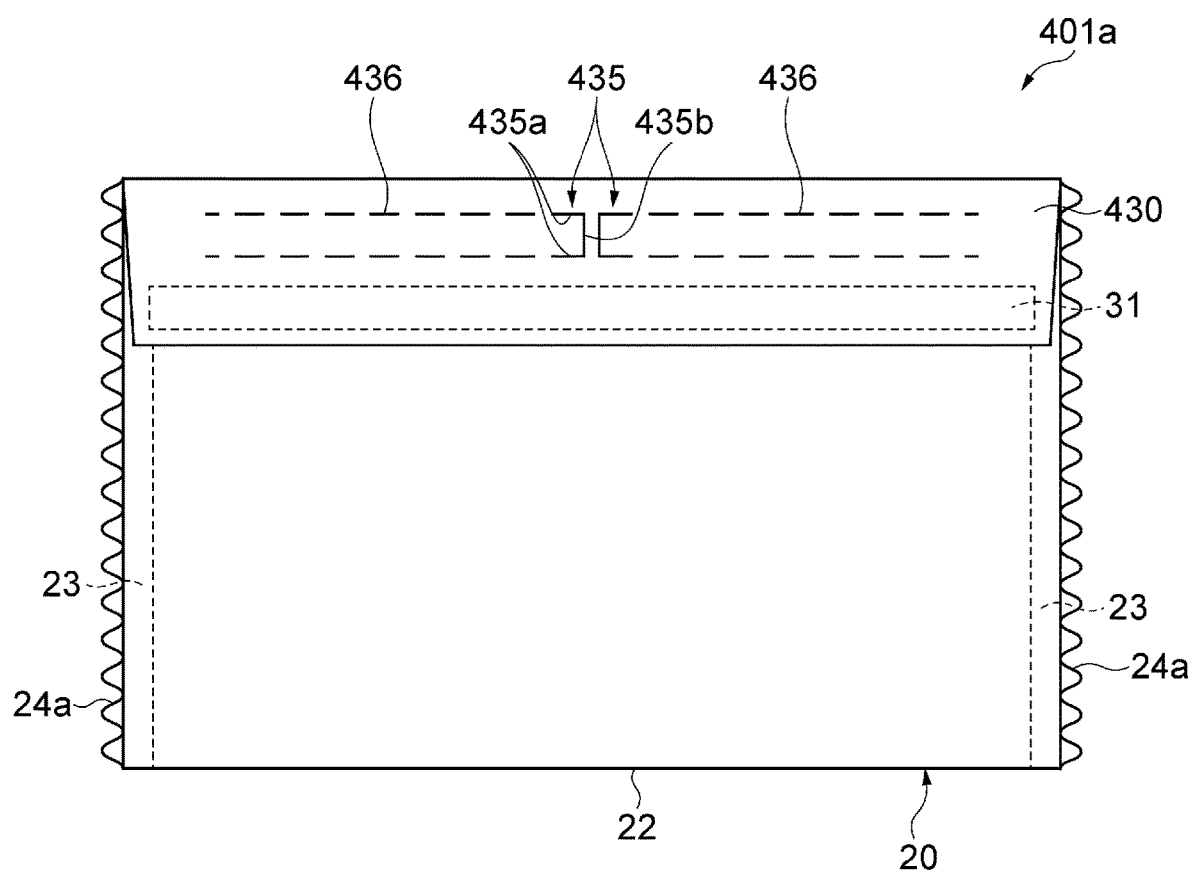
FIG. 15 is a plan view of a modification of the packaging bag according to the fifth embodiment of the present invention.

In the packaging bag of the present embodiment, as shown in FIG. 15, the wavy section 24a which is the impact absorption section can be provided on the end of the packaging bag 401a as with the modified example of the first embodiment. Accordingly, drop impact can be mitigated by the wavy section 24a absorbing an impact to the packaging bag 401a to thereby appropriately protect the contents. Further, the unsealed section 24b may be provided as the impact absorption section instead of the wavy section 24a.

Sixth Embodiment

A packaging bag 501 according to the present embodiment is the same as the fifth embodiment in that it is formed of the laminate 10, but differs from the packaging bag 401 of the fifth embodiment in the shape of the tab and the perforations. The following provides a description mainly of the differences from the fifth embodiment. The elements and components that are the same as those of the first embodiment are referred by the same reference numbers, and detailed description thereof will be omitted.

Figure 16:
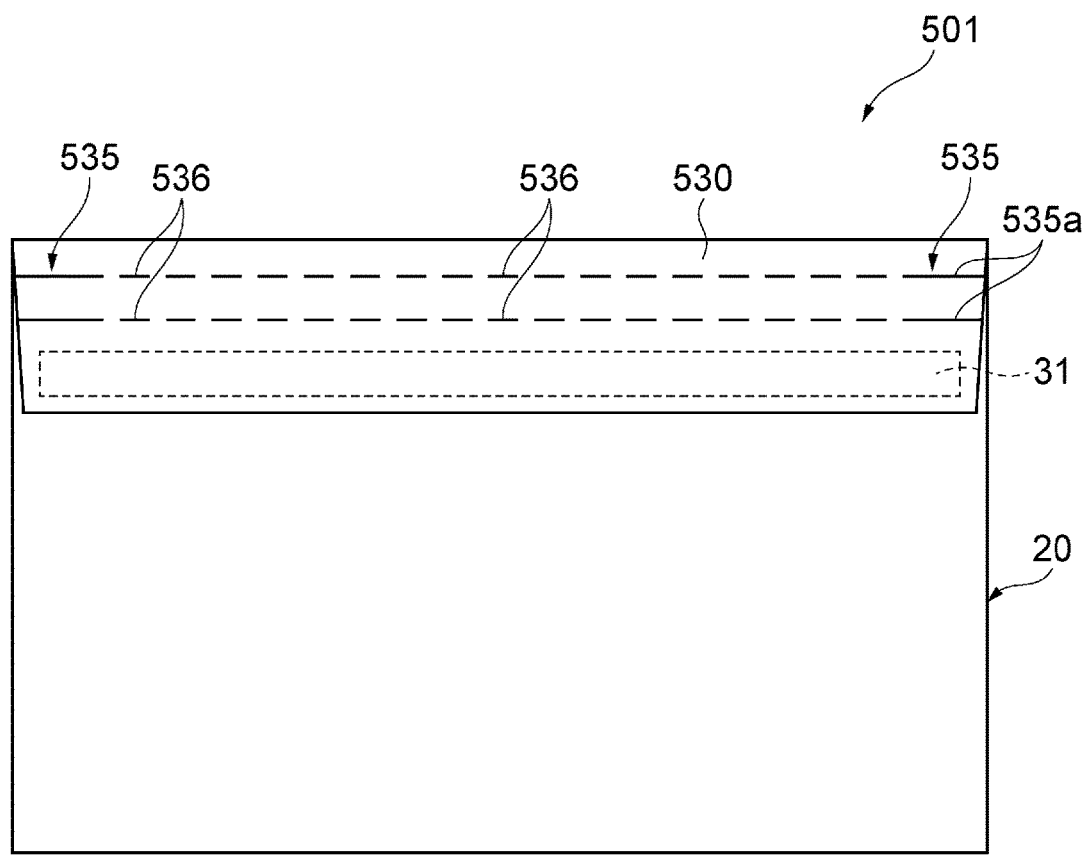
FIG. 16 is a plan view of a packaging bag according to a sixth embodiment of the present invention.

As shown in FIG. 16, the packaging bag 501 includes a main body 20 and a sealing section 530, and has a substantially rectangular shape in plan view. In the sealing section 530, the perforations 536 are provided by two lines of perforations formed in the width direction. The direction in which the perforations 536 extend corresponds to the MD direction of the laminate 10. Further, the perforations 536 are provided at a position spaced from the adhesion region 31 to the proximal end side of the sealing section 530 by 3 to 20 mm. Tabs 535 are continuously formed on both ends of the perforations 536. The tab 535 has two cutting lines 535a which are spaced in the opening direction and extend in the width direction. These cutting lines 535a are formed to be continuous from the end in the width direction of the sealing section 530 to the perforations 536. A user can easily open the packaging bag 501 sealed by the adhesion region 31 by pulling the tab 535 of the packaging bag 501 in the width direction. Further, the packaging bag 501 has the same effects as those of the packaging bag 1 of the first embodiment.

Figure 17:
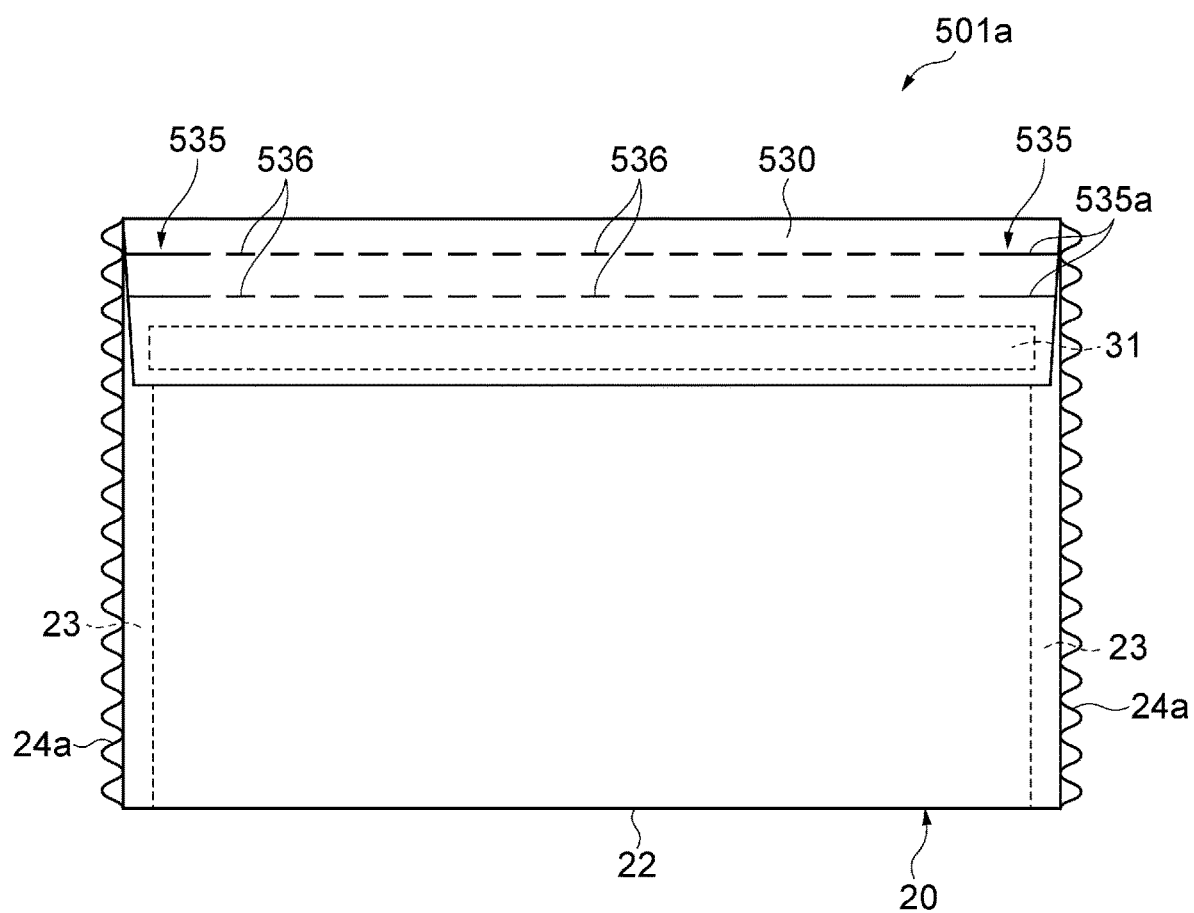
FIG. 17 is a plan view of a modification of the packaging bag according to the sixth embodiment of the present invention.

In the packaging bag of the present embodiment, as shown in FIG. 17, the wavy section 24a which is the impact absorption section can be provided on the end of the packaging bag 501a as with the modified example of the first embodiment. Accordingly, drop impact can be mitigated by the wavy section 24a absorbing an impact to the packaging bag 501a to thereby appropriately protect the contents. Further, the unsealed section 24b may be provided as the impact absorption section instead of the wavy section 24a.

Seventh Embodiment

A packaging bag 601 according to the present embodiment is the same as the sixth embodiment in that it is formed of the laminate 10, but differs from the packaging bag 501 of the sixth embodiment in that it has a tear tape. The following provides a description mainly of the differences from the sixth embodiment. The elements and components that are the same as those of the first embodiment are referred to by the same reference numbers, and detailed description thereof will be omitted.

Figure 18:
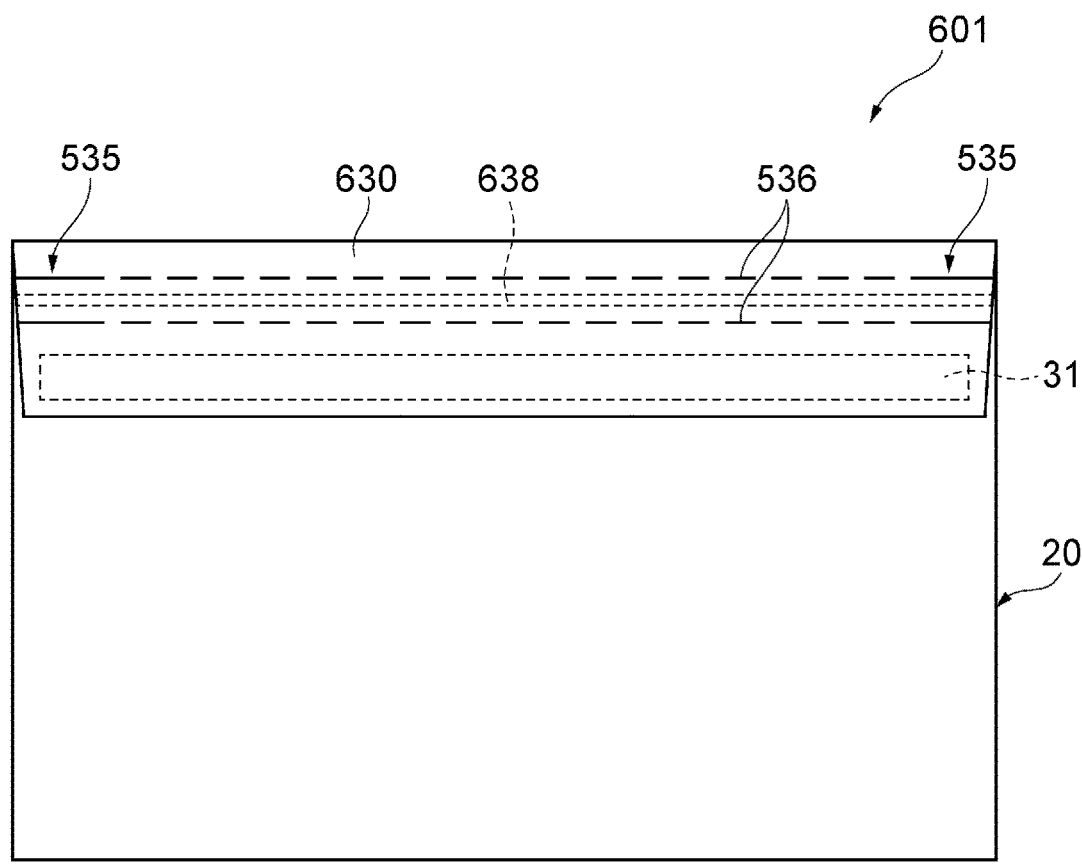
FIG. 18 is a plan view of a packaging bag according to a seventh embodiment of the present invention.

As shown in FIG. 18, the packaging bag 601 includes a main body 20 and a sealing section 630, and has a substantially rectangular shape in plan view. The sealing section 630 has perforations 536 and tabs 535 as with the sixth embodiment. On the inner side surface of the sealing section 630, a tear tape 638 which extends in the width direction is formed at a position where the perforations 536 and the tabs 535 are provided. The tear tape 638 is continuously formed from one end to the other end in the width direction of the sealing section 630. A user can easily open the packaging bag 601 sealed by the adhesion region 31 by pulling the tab 535 of the packaging bag 601 in the width direction. Further, the packaging bag 601 has the same effects as those of the packaging bag 1 of the first embodiment.

Figure 19:
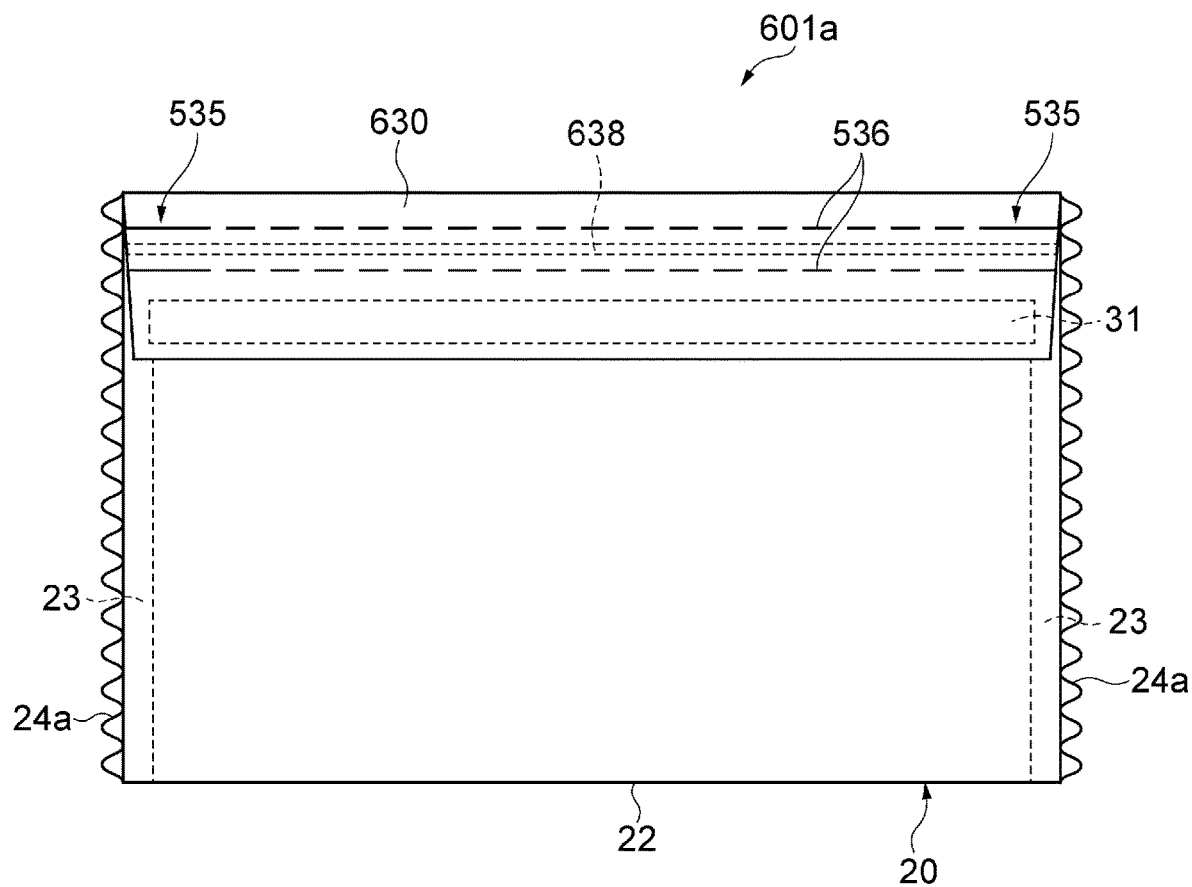
FIG. 19 is a plan view of a modification of the packaging bag according to the seventh embodiment of the present invention.

In the packaging bag of the present embodiment, as shown in FIG. 19, the wavy section 24a which is the impact absorption section can be provided on the end of the packaging bag 601a as with the modified example of the first embodiment. Accordingly, drop impact can be mitigated by the wavy section 24a absorbing an impact to the packaging bag 601a to thereby appropriately protect the contents. Further, the unsealed section 24b may be provided as the impact absorption section instead of the wavy section 24a.

While the embodiments of the present invention were described in detail with reference to the drawings, specific configurations are not limited to these embodiments. For example, in the aforementioned example, the sealed section 23 was formed on one end edge in the MD direction of the foamed sheet in the laminate 10 so as to extend in the direction perpendicular to the MD direction. However, in this case, the direction perpendicular to the MD direction should be construed as including not only being exactly at a right angle but also an angle with a margin of approximately ±10 degrees.

Further, configurations of the aforementioned embodiments may be partially combined or replaced. For example, a tear tape may be formed along the perforations 436 in the sealing section 430 of the fifth embodiment as with the tear tape 638 in the sealing section 630 of the seventh embodiment.

Further, the impact absorption section of the above embodiment may be formed in the unsealed section or in the wavy section. In addition, the impact absorption section is only required to be formed of the laminate which forms the packaging bag. For example, the impact absorption section may be provided by the outer edge of the sealed section formed in a comb shape. Further, the impact absorption section may be formed on part of or the entire peripheral edge of the packaging bag as with other embodiments.

Further, for the adhesion region 31 that adheres the main body 20 and the sealing section 30, a general hot melt adhesive or the like can be used. However, the adhesion region 31 may contain a synthetic rubber-based thermoplastic adhesive such as a styrene-isoprene based thermoplastic adhesive (pressure sensitive adhesive). This adhesive may contain additives such as a filler, thickener, heat resistant resin and pigment. Further, the adhesive may have viscosity (melt viscosity) at 140° C. of 15000 mPa·s or more. In this case, since the adhesive in the adhesion region 31 has high adhesiveness at normal temperature, the paper layer 3 that constitutes the surface of the main body 20 can successfully exhibit delamination fracture in opening of the sealing section 30. The viscosity of the adhesive may be, for example, 50000 mPa·s or more, or alternatively 68000 mPa·s or more at 140° C. Further, the viscosity of the adhesive may be, for example, 270000 mPa·s or more at 120° C., 30000 mPa·s or more at 160° C., and 16500 mPa·s or more at 180° C. The sealing strength of the adhesion region 31 may be, for example, in the range of 6 N to 15 N. The sealing strength may be measured in accordance with JIS Z 1707:1997, for example, by using a tensile and compression test machine (Tensilon RTF-1250, manufactured by A & D Co., Ltd.).

When the thickness of the adhesion region 31 is more than 50 μm and the viscosity of the adhesive at 140° C. is 50000 mPa·s or more as described above, the adhesion region 31 can exhibit high adhesiveness at normal temperature. Further, since the adhesive contained in the adhesion region 31 is a synthetic rubber-based thermoplastic adhesive, the adhesion region 31 tends to have high hardness. In the packaging bag 1 or the like using the adhesion region 31, since the adhesion region 31 is less likely to be broken in opening of the sealing section 30, part of at least either the paper layer 3 of the main body 20 or the adhesive layer 5 of the sealing section 30 to which the adhesion region 31 is adhered, instead of the adhesion region 31, is delaminated and broken in opening of the packaging bag 1 or the like. Accordingly, after the sealing section was opened, evidence of opening is created on the packaging bag so that tampering can be prevented. Further, the evidence of opening corresponds to a portion of the main body 20 and the sealing section 30 which is delaminated and broken by the adhesion region 31.

The term tampering as used herein refers to, for example, opening of the packaging bag and alteration or removal of the contents by a third party other than the addressee during delivery. If no evidence of opening is created when the packaging bag was opened by a third party, it is difficult for the addressee to determine whether the contents were tampered with. However, by using the packaging bag having the aforementioned adhesion region, the addressee can easily determine whether it was tampered with or not depending on the presence or absence of evidence of opening. Therefore, by using such a packaging bag, tampering such as removal of the contents can be prevented. In addition, the packaging bag 1 does not need to be provided with an opening assistance function such as perforations to ensure the sealing section 30 can be opened without requiring particular force.

Further, when a natural rubber-based adhesive is uses as an adhesive, the natural rubber-based adhesive and the paper layer 3 of the main body 20 tend to be easily peeled from each other. Accordingly, even if the natural rubber-based adhesive has high viscosity (adhesiveness), the paper layer 3 fails to exhibit delamination fracture. As a consequence, the packaging bag may be resealed without leaving evidence of opening. Therefore, it is preferred to use a synthetic rubber-based thermoplastic adhesive as an adhesive.

Further, the adhesive used may be a styrene-isoprene based thermoplastic adhesive. In this case, evidence of opening can be more reliably created on the packaging bag 1. The thickness of the adhesion region 31 may be 100 μm or more. In this case, since the amount of an adhesive per unit area increases in the adhesion region 31, evidence of opening is more reliably created in the packaging bag 1.

Further, the surface of the main body 20 adhering to the adhesion region 31 may be the paper layer 3 in the paper substrate 8, or alternatively, the surface of the sealing section 30 adhering to the adhesion region 31 may be the adhesive layer 5 in the paper substrate 8. In this case, in opening of the sealing section 30, at least part of the paper layer 3 that constitutes the surface of the main body 20 and adheres to the adhesion region 31, instead of the adhesion region 31, is delaminated and broken to thereby create evidence of opening. The adhesion region 31 may be provided in either the main body 20 or the sealing section 30. Further, the length of the adhesion region 31 in the opening direction is provided to leave a margin of, for example, approximately in the range of 2 mm to 10 mm from the inside of the opening width. The thickness of the sealing section 30 is, for example, more than 50 μm. In this case, a sufficient amount of an adhesive can be provided per unit area in the sealing section 30, and the paper layer 3 that constitutes the surface of the main body 20 can successfully exhibit delamination fracture in opening of the sealing section 30. The thickness of the sealing section 30 may be 100 μm or more and 200 μm or less.

EXAMPLES

The above embodiments will be further described with reference to the examples and comparative examples as below. However, the sizes and the like of the packaging bag are merely examples, and the above embodiments are not limited to what is described in the examples. The packaging bags according to Examples 1 to 11 below have the shape of the packaging bag 1 of the first embodiment. Table 1 shows Examples 1 to 11 and Comparative Examples 1 to 6.

TABLE 1

| Sample | Paper substrate (Bending stiffness) | Adhesive layer | Foamed sheet (Thickness) | Foamed sheet (Expansion ratio) | Sealant |
|---|---|---|---|---|---|
| Example 1 | 241 mN | PE 15 μm | 1.5 mm | 30 times | HDPE 15 μm |
| Example 2 | 241 mN | PE 15 μm | 1.0 mm | 30 times | HDPE 15 μm |
| Example 3 | 241 mN | PE 15 μm | 3.0 mm | 30 times | HDPE 15 μm |
| Example 4 | 241 mN | PE 15 μm | 4.0 mm | 30 times | HDPE 15 μm |
| Example 5 | 241 mN | PE 15 μm | 1.5 mm | 20 times | HDPE 15 μm |
| Example 6 | 241 mN | PE 15 μm | 1.5 mm | 40 times | HDPE 15 μm |
| Example 7 | 241 mN | PE 15 μm | 1.5 mm | 50 times | HDPE 15 μm |
| Example 8 | 241 mN | PE 15 μm | 1.5 mm | 30 times | LLDPE 30 μm |
| Example 9 | 159 mN | PE 15 μm | 1.5 mm | 30 times | HDPE 15 μm |
| Example 10 | 393 mN | PE 15 μm | 1.5 mm | 30 times | HDPE 15 μm |
| Example 11 | 531 mN | PE 15 μm | 1.5 mm | 30 times | HDPE 15 μm |
| Comparative Example 1 | 166 mN | — | 2.5 mm | — | HDPE 15 μm |
| Comparative Example 2 | 241 mN | PE 15 μm | 5.5 mm | 30 times | HDPE 15 μm |
| Comparative Example 3 | 241 mN | PE 15 μm | 0.5 mm | 30 times | HDPE 15 μm |
| Comparative Example 4 | 93 mN | PE 15 μm | 1.5 mm | 30 times | HDPE 15 μm |
| Comparative Example 5 | 93 mN | PE 15 μm | 1.5 mm | 30 times | LLDPE 30 μm |
| Comparative Example 6 | 961 mN | PE 15 μm | 1.5 mm | 30 times | HDPE 15 μm |

Example 1

First, on a paper substrate having a paper layer and an adhesive layer made of PE with 15 μm thickness, a sealant layer made of a foamed PE sheet with 1.5 mm thickness and HDPE with 15 μm thickness was thermally laminated to thereby obtain a laminate. Subsequently, both sides of the laminate in the opening direction were thermally sealed with the sealant layer facing inward so that the packaging bag of Example 1 was obtained with a long side (side in the width direction) of 255 mm and a short side (side in the opening direction) of 195 mm. The grammage of the paper substrate was 75 g/m², and the bending stiffness of the paper substrate in the MD direction was 241 mN. Further, the expansion ratio of the foamed PE sheet was 30 times. The bending stiffness was measured by a loop stiffness tester (e.g., manufactured by Toyo Seiki Co., Ltd.). The measurement was performed using a sample, which was a loop of a strip made of a paper substrate having 15 mm width and 160 mm length. The number of samples was five.

Example 2

In Example 2, the thickness of the foamed PE sheet was different from Example 1. That is, the packaging bag of Example 2 was formed of a laminate composed of a paper substrate having a bending stiffness of 241 mN, a foamed PE sheet having a thickness of 1.0 mm and an expansion ratio of 30 times, and an HDPE sheet having a thickness of 15 μm, laminated in the same manner as Example 1.

Example 3

In Example 3, the thickness of the foamed PE sheet was different from Example 1. That is, the packaging bag of Example 3 was formed of a laminate composed of a paper substrate having a bending stiffness of 241 mN, a foamed PE sheet having a thickness of 3.0 mm and an expansion ratio of 30 times, and an HDPE sheet having a thickness of 15 μm, laminated in the same manner as Example 1.

Example 4

In Example 4, the thickness of the foamed PE sheet was different from Example 1. That is, the packaging bag of Example 4 was formed of a laminate composed of a paper substrate having a bending stiffness of 241 mN, a foamed PE sheet having a thickness of 4.0 mm and an expansion ratio of 30 times, and an HDPE sheet having a thickness of 15 μm, laminated in the same manner as Example 1.

Example 5

In Example 5, the expansion ratio of the foamed PE sheet was different from Example 1. That is, the packaging bag of Example 5 was formed of a laminate composed of a paper substrate having a bending stiffness of 241 mN, a foamed PE sheet having a thickness of 1.5 mm and an expansion ratio of 20 times, and an HDPE sheet having a thickness of 15 μm, laminated in the same manner as Example 1.

Example 6

In Example 6, the expansion ratio of the foamed PE sheet was different from Example 1. That is, the packaging bag of Example 6 was formed of a paper substrate having a bending stiffness of 241 mN, a foamed PE sheet having a thickness of 1.5 mm and an expansion ratio of 40 times, and an HDPE sheet having a thickness of 15 μm, laminated in the same manner as Example 1.

Example 7

In Example 7, the expansion ratio of the foamed PE sheet was different from Example 1. That is, the packaging bag of Example 7 was formed of a laminate composed of a paper substrate having a bending stiffness of 241 mN, a foamed PE sheet having a thickness of 1.5 mm and an expansion ratio of 50 times, and an HDPE sheet having a thickness of 15 μm, laminated in the same manner as Example 1.

Example 8

In Example 8, the configuration of the sealant layer was different from Example 1. That is, the packaging bag of Example 8 was formed of a laminate composed of a paper substrate having a bending stiffness of 241 mN, a foamed PE sheet having a thickness of 1.5 mm and an expansion ratio of 30 times, and an LLDPE sheet having a thickness of 30 μm, laminated in the same manner as Example 1.

Example 9

In Example 9, the grammage and bending stiffness of the paper substrate was different from Example 1. That is, the packaging bag of Example 9 was formed of a laminate composed of a paper substrate having a grammage of 60 g/m$^2$ and a bending stiffness of 159 mN, a foamed PE sheet having a thickness of 1.5 mm and an expansion ratio of 30 times, and an HDPE sheet having a thickness of 15 μm, laminated in the same manner as Example 1.

Example 10

In Example 10, the grammage and bending stiffness of the paper substrate was different from Example 1. That is, the packaging bag of Example 10 was formed of a laminate composed of a paper substrate having a grammage of 84 g/m$^2$ and a bending stiffness of 393 mN, a foamed PE sheet having a thickness of 1.5 mm and an expansion ratio of 30 times, and an HDPE sheet having a thickness of 15 μm, laminated in the same manner as Example 1.

Example 11

In Example 11, the grammage and bending stiffness of the paper substrate was different from Example 1. That is, the packaging bag of Example 11 was formed of a laminate composed of a paper substrate having a grammage of 100 g/m$^2$ and a bending stiffness of 531 mN, a foamed PE sheet having a thickness of 1.5 mm and an expansion ratio of 30 times, and an HDPE sheet having a thickness of 15 μm, laminated in the same manner as Example 1.

Comparative Example 1

In the packaging bag of Comparative Example 1, an air bubble cushioning material made of PE with 2.5 mm thickness was disposed inside a packaging bag made of kraft paper. The air bubble cushioning material and kraft paper were bonded to each other by an adhesive. The kraft paper had a grammage of 80 g/m$^2$ and a bending stiffness of 166 mN. In this packaging bag, a sealed section was provided on one of the long sides, and an adhesive tape was adhered to the sealed section.

Comparative Example 2

In Comparative Example 2, the thickness of the foamed PE sheet was different from Example 1. That is, the packaging bag of Comparative Example 2 was formed of a laminate composed of a paper substrate having a bending stiffness of 241 mN, a foamed PE sheet having a thickness of 5.5 mm and an expansion ratio of 30 times, and an HDPE sheet having a thickness of 15 μm, laminated in the same manner as Example 1.

Comparative Example 3

In Comparative Example 3, the thickness of the foamed PE sheet was different from Example 1. That is, the packaging bag of Comparative Example 2 was formed of a laminate composed of a paper substrate having a bending stiffness of 241 mN, a foamed PE sheet having a thickness of 0.5 mm and an expansion ratio of 30 times, and an HDPE sheet having a thickness of 15 μm, laminated in the same manner as Example 1.

Comparative Example 4

In Comparative Example 4, the grammage and bending stiffness of the paper substrate was different from Example 1. That is, the packaging bag of Comparative Example 4 was formed of a laminate composed of a paper substrate having a grammage of 50 g/m$^2$ and a bending stiffness of 93 mN, a foamed PE sheet having a thickness of 1.5 mm and an expansion ratio of 30 times, and an HDPE sheet having a thickness of 15 μm, laminated in the same manner as Example 1.

Comparative Example 5

In Comparative Example 5, the configuration of the sealant layer was different from Comparative Example 4. That is, the packaging bag of Comparative Example 5 was formed of a laminate composed of a paper substrate having a grammage of 50 g/m$^2$ and a bending stiffness of 93 mN, a foamed PE sheet having a thickness of 1.5 mm and an expansion ratio of 30 times, and an LLDPE sheet having a thickness of 30 μm, laminated in the same manner as Example 1.

Comparative Example 6

In Comparative Example 6, the grammage and bending stiffness of the paper substrate was different from Example 1. That is, the packaging bag of Comparative Example 6 was formed of a laminate composed of a paper substrate having a grammage of 120 g/m$^2$ and a bending stiffness of 961 mN, a foamed PE sheet having the thickness of 1.5 mm and an expansion ratio of 30 times, and an HDPE sheet having a thickness of 15 μm, laminated in the same manner as Example 1.

For Examples 1 to 11 and Comparative Examples 1 to 6, the puncture strength, impact resistance and processability were tested to evaluate the basic performance practically required as a packaging bag.

The evaluation of puncture strength was performed on the basis of the puncture strength (compliant with JIS Z 1707)

of the laminate that forms the packaging bag. The evaluation was made as follows: A. The puncture strength was 6.5 N or more, which was rated as being most preferred; B. The puncture strength was in the range of 4.5N or more and less than 6.5 N, which was rated as having no practical problem; and C. The puncture strength was less than 4.5N, which was rated as having a practical problem. The number of samples was 5.

An impact resistance test was a test to check whether a packaging bag and the contents inside are not damaged when a certain impact is applied to the packaging bag containing the contents. The test was performed by dropping a sample containing the contents from a position of 70 cm height. The contents were a compact disk (CD) stored in a plastic case. The test was performed 7 times per sample with different impact locations. The impact locations were front and rear surfaces of the packaging bag, a side of the packaging bag on the sealing section side, a side of the packaging bag opposite to the sealing section, one of the sides in the width direction of the packaging bag, a corner between the other of the sides in the width direction and the side on the sealing section side, and a corner between the other of the sides in the width direction and the side opposite to the sealing section. The number of samples was 50. The evaluation was made as follows: A. The breakage ratio of the plastic case was less than 40%, which was rated as being preferred; B. The breakage ratio was in the range of 40% or more and less than 70%, which was rated as having no practical problem; and C. The breakage ratio was more than 70%, which was rated as having a practical problem.

The evaluation of processability was performed based on whether the laminate can be easily folded, and can be appropriately processed by a laminating machine, bag forming machine, or the like in the production process. That is, the evaluation was a flexibility evaluation, and rated as follows: A. Bending was easy according to the flexibility evaluation; B. No practical problem found; and C. A practical problem found.

Table 2 shows the results of these evaluation.

TABLE 2

| Sample | Puncture strength | Impact resistance | Processability |
| --- | --- | --- | --- |
| Example 1 | A | B | B |
| Example 2 | A | B | B |
| Example 3 | A | A | B |
| Example 4 | A | A | B |
| Example 5 | A | B | B |
| Example 6 | A | A | B |
| Example 7 | A | B | B |
| Example 8 | A | A | B |
| Example 9 | B | B | B |
| Example 10 | A | A | B |
| Example 11 | A | A | B |
| Comparative Example 1 | B | C | A |
| Comparative Example 2 | A | A | C |
| Comparative Example 3 | C | C | B |
| Comparative Example 4 | C | C | B |
| Comparative Example 5 | C | C | B |
| Comparative Example 6 | A | A | C |

As the results of evaluation, a practical problem was not found in Examples 1 to 11. On the other hand, Comparative Example 1 was evaluated as C in the impact resistance test. The reason for this seems to be that the entire external material that constitutes the packaging bag of Comparative Example 1 has low strength since the bag is configured of the paper substrate having a relatively low bending stiffness and a highly soft air bubble cushioning material attached to the paper substrate. In this case, impact tends to be transferred to the contents particularly when the packaging bag is dropped with the side or corner facing downward. In Comparative Example 2, which uses a foamed sheet having a large thickness as 5.5 mm, the processability was evaluated as C. In Comparative Example 3, which uses a foamed sheet having a small thickness as 0.5 mm, the impact resistance and puncture strength were both evaluated as C. In Comparative Examples 4 and 5, which use a paper substrate having small bending stiffness, the impact resistance and puncture strength were evaluated as C. In Comparative Example 6, the impact resistance and puncture strength were evaluated as A, while the processability was evaluated as C due to the bending stiffness of the paper substrate being too large. Based on the above evaluations, it was found that the contents were appropriately protected by the packaging bag according to the present embodiment.

Next, the examples will be described for an anti-tamper function with the adhesive included in the adhesion region 31 having the viscosity of a predetermined amount or more. Similarly to the above examples, the sizes and the like of the packaging bag are merely examples, and the above embodiments are not limited to what is described in the examples. Further, the packaging bags according to Example 21 and Comparative Examples 21 to 23 described below have the shape of the packaging bag 1 of the first embodiment (see FIGS. 1 to 4).

Example 21

First, a paper substrate formed of a paper layer and an adhesive layer made of polyethylene provided on the paper layer. As the paper layer, Taio Atlas manufactured by Daio Paper Corporation (grammage: 75 g/m$^2$) was used. Further, as the adhesive layer, a polyethylene layer having 30 μm thickness was used. Then, a foam layer and a sealant layer was laminated by polyethylene sandwich lamination. As the foam layer, Minafoam (registered trademark) manufactured by Sakai Chemical Industry Co., Ltd. having approximately 1.0 mm thickness was used. Further, as the sealant layer, a polyethylene layer having 30 μm thickness was used. Then, the paper substrate, the foam layer, and the sealant layer were laminated by thermal lamination to thereby obtain a laminate. Then, this laminate was folded with the sealant layer facing inward. At this time, the laminate was folded to have a long side (side in the width direction) of 255 mm length and a short side (side in the opening direction) of 195 mm length. Both sides in the width direction of the folded laminate were thermally sealed to thereby obtain the packaging bag of Example 21 having the main body with an opening and the sealing section. Further, the sealing section of the packaging bag had only the paper substrate.

Then, on the adhesive layer of the substrate that constitutes the sealing section, an adhesive was applied in the width direction to thereby form an adhesive layer having 10 mm width, 250 mm length, and 100 μm thickness. As the adhesive, a styrene-isoprene based thermoplastic adhesive (TN-571Z, manufactured by MORESCO corporation), which is a synthetic rubber-based thermoplastic adhesive, was used. Then, the sealing section was folded over, and the adhesive layer was adhered to the main body to thereby seal the packaging bag. In Example 21, the adhesive had viscosity of 68000 mPa·s at 140° C.

Comparative Example 21

The packaging bag which was sealed in the same manner as Example 21 except that an adhesive layer having 50 μm thickness was prepared.

Comparative Example 22

The packaging bag which was sealed in the same manner as Example 21 except that a styrene-isoprene based thermoplastic adhesive (TN-553Z, manufactured by MORESCO corporation) was used as the adhesive was prepared. In Comparative Example 22, the adhesive had viscosity of 15000 mPa·s at 140° C.

Comparative Example 23

The packaging bag which was sealed in the same manner as Example 21 except that a natural rubber based thermoplastic adhesive (HIRODINE 5132, manufactured by Yasuhara Chemical Co., Ltd.) was used as the adhesive was prepared. In Comparative Example 23, the adhesive had viscosity of 21000 mPa·s at 160° C.

(Test for Evidence of Opening)

After the packaging bags of Example 21 and Comparative Examples 21 to 23 were left at normal temperature for more than 1 hour, the sealing sections were opened. Opening of the sealing section was measured by using a tensile and compression test machine (Tensilon RTF-1250, manufactured by A & D Co., Ltd.). Specifically, while the main body is fixed, an end of the tab of the sealing section was held and pulled in the direction of elevation angle of 45 degrees at a tensile rate of 200 mm/min. After the packaging bag was opened, whether evidence of opening was created or not in the packaging bag was visually observed. When evidence of opening was recognized by visual observation, it was rated as A. When evidence of opening was not recognized by visual observation, it was rated as C. Table 3 shows the test results of Example 21 and Comparative Examples 21 to 23.

(Resealing Test)

For Example 21 and Comparative Examples 21 to 23, evaluation was performed whether the packaging bag can be resealed or not after the evaluation of evidence of opening. In this evaluation, no adhesive was added to the packaging bag. When resealing was not possible, it was rated as A. When resealing was possible, it was rated as C. Table 3 shows the test results of Example 21 and Comparative Examples 21 to 23.

(Sealing Strength)

For Example 21 and Comparative Examples 21 to 23, the sealing strength of the adhesion region was measured by using a tensile and compression test machine (Tensilon RTF-1250, manufactured by A & D Co., Ltd.) in accordance with JIS Z 1707:1997. The strength when the main body and the sealing section was peeled from each other with the tensile rate of 200 mm/min was determined as the sealing strength.

TABLE 3

| Sample | Evidence of opening | Resealing | Sealing strength (N) |
|---|---|---|---|
| Example 21 | A | A | 7.7 |
| Comparative Example 21 | C | A | 3.0 |
| Comparative Example 22 | C | C | 12.1 |
| Comparative Example 23 | C | C | 15.0 |

As shown in Table 3, in Example 21, evidence of opening was recognized and resealing was not possible. On the other hand, in Comparative Example 21, evidence of opening was not recognized, while resealing was not possible. Therefore, in Comparative Example 21, resealing was possible without creating evidence of opening by, for example, applying an additional adhesive on the adhesive layer after the packaging bag was opened. As described above, the thickness of the adhesive layer of Comparative Example 21 was smaller than the thickness of the adhesive layer of Example 21. Therefore, in order to create evidence of opening in the packaging bag, it seems that the amount of adhesive applied needs to be adjusted.

In Comparative Example 22, evidence of opening was not recognized and resealing was possible. As described above, the viscosity of the adhesive of Comparative Examples was smaller than the viscosity of the adhesive of Example 1. Therefore, in order to create evidence of opening in the packaging bag, it seems that the viscosity of the adhesive needs to be adjusted.

In Comparative Example 23, evidence of opening was not recognized and resealing was possible. As described above, the adhesive of Comparative Example 3 was a natural rubber based thermoplastic adhesive, while the adhesive of Example 21 was a synthetic rubber-based thermoplastic adhesive. Therefore, in order to create evidence of opening in the packaging bag, it seems that a synthetic rubber-based thermoplastic adhesive needs to be used as an adhesive.

For the packaging bag having an anti-tamper function with the adhesive included in the adhesion region 31 having the viscosity of a predetermined amount or more, the supplementary notes are provided as below.

(Supplementary Note 1)

A packaging bag made of a laminate formed in a bag shape, the laminate being composed of a substrate, and a foamed resin sheet laminated on the substrate, the packaging bag comprising: a bag-shaped main body having an opening; a sealing section for sealing the opening of the main body; and an adhesive layer provided on one of the main body and the sealing section so as to adhere the main body and the sealing section to each other, wherein a thickness of the adhesive layer is more than 50 μm, and the adhesive is a synthetic rubber-based thermoplastic adhesive having a viscosity of 50000 mPa·s or more at 140° C.

(Supplementary Note 2)

The packaging bag according to the supplementary note 1, wherein the adhesive is a styrene-isoprene based thermoplastic adhesive.

(Supplementary Note 3)

The packaging bag according to the supplementary note 1 or 2, wherein the thickness of the adhesive layer is 100 μm or more.

(Supplementary Note 4)

The packaging bag according to any one of the supplementary notes 1 to 3, wherein a surface of the main body which adheres to the adhesive layer is a paper layer in the substrate, and a surface of the sealing section which adheres to the adhesive layer is a resin film in the substrate.

(Supplementary Note 5)

The packaging bag according to any one of the supplementary notes 1 to 3, wherein a surface of the main body which adheres to the adhesive layer is a paper layer in the substrate, and a surface of the sealing section which adheres to the adhesive layer is the resin foamed sheet.

(Supplementary Note 6)

The packaging bag according to any one of the supplementary notes 1 to 5, wherein the sealing section is integrally formed with the main body, and extends outside the main body relative to the opening.

According to the packaging bag of the supplementary note 1, the thickness of the adhesive layer is more than 50 µm, and the viscosity of the adhesive at 140° C. is 50000 mPa·s or more. Accordingly, the adhesive layer has high adhesiveness at normal temperature. Further, since the adhesive contained in the adhesive layer is a synthetic rubber-based thermoplastic adhesive, the adhesive layer tends to have high hardness. In the packaging bag having such an adhesive layer, the adhesive layer is less likely to be broken in opening of the sealing section. As a consequence, in opening of the packaging bag, at least part of either the main body or the sealing section to which the adhesive layer is adhered, instead of the adhesive layer, is delaminated and broken. Accordingly, in opening of the sealing section, evidence of opening is created on the packaging bag so that tampering can be prevented.

According to the packaging bag of the supplementary note 2, evidence of opening can be more reliably created on the packaging bag. According to the packaging bag of the supplementary note 3, since the amount of an adhesive per unit area increases in the adhesion layer, evidence of opening is more reliably created in the packaging bag. According to the packaging bag of the supplementary note 4, in opening of the sealing section, at least part of the paper layer that constitutes the surface of the main body and adheres to the adhesion layer, instead of the adhesion layer, is delaminated and broken. According to the packaging bag of the supplementary note 5, in opening of the sealing section, at least part of the paper layer that constitutes the surface of the main body and adheres to the adhesion layer, instead of the adhesion layer, is delaminated and broken to thereby create evidence of opening.

Alteration of the Present Invention

Next, with reference to FIGS. 20 to 25, examples in which the aforementioned impact absorption section is applied to the packaging bag formed of another laminate will be described.

First Embodiment of Alteration

Figure 20A:
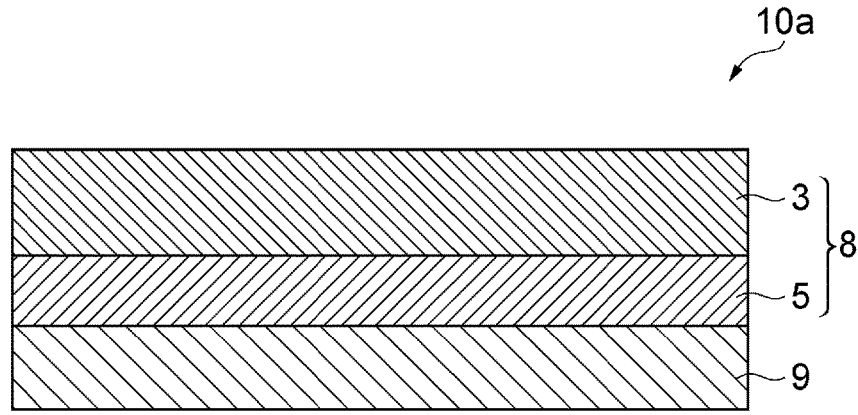
FIGS. 20A and 20B are schematic cross-sectional views that illustrate a structure of another laminate constituting a packaging bag according to another embodiment.
Figure 20B:
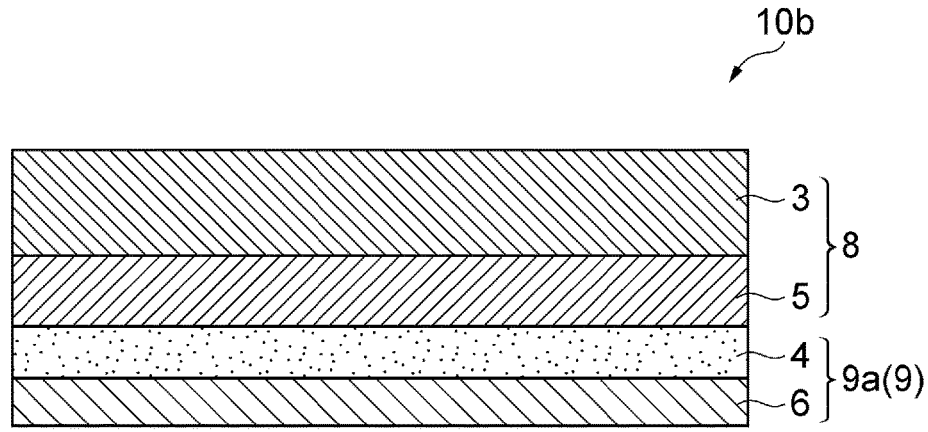

FIGS. 20A and 20B are schematic cross-sectional views that illustrates a structure of a laminate 10a constituting a packaging bag 701 according to the present embodiment. As shown in FIG. 20A, the laminate 10a includes a paper substrate 8 which includes a paper layer 3, and a sealant layer 9 laminated on an inner surface of the paper substrate 8. The paper substrate 8 includes the paper layer 3, which constitutes an outer surface of the packaging bag 1, and an adhesive layer 5 laminated on the paper layer 3. In the present embodiment, the adhesive layer 5 is made of polyethylene. The paper substrate 8 has an MD direction, which is a flow direction of the material due to the production processes. The paper layer 3 and the adhesive layer 5, which constitute the paper substrate 8, have the MD direction in the same direction. A bending stiffness of the paper substrate 8 in the MD direction is in the range of 150 mN to 700 mN, and preferably in the range of 200 mN to 600 mN. Further, a thickness of the adhesive layer 5 is in the range of 5 to 40 µm, and a grammage of the entire paper substrate 8 including the paper layer 3 is in the range of 50 g/m² to 120 g/m². Further, a thickness of the paper substrate 8 is in the range of 50 to 250 µm, for example.

The sealant layer 9 is a layer having a portion to be thermally sealed when the laminate 10a is formed into a bag shape. A material for the sealant layer 9 may be, for example, linear low density polyethylene (LLDPE), high density polyethylene (HDPE), or the like. Further, as shown in FIG. 20B, a foamed film 9a may be used as the sealant layer 9. The foamed film 9a, which is a laminate made up of a foamed resin layer 4 having interconnected pores and a polyolefin layer 6, is formed by using a foaming agent. When the foamed film 9a is used, it is laminated with the foamed resin layer 4 being in contact with the paper substrate 8. A thickness of the sealant layer 9 is, for example, in the range of 100 to 200 µm. The sealant layer 9 (when the foamed film 9a is used, the polyolefin layer 6) is an inner surface of the packaging bag 1 and a layer in contact with the contents.

Although the thicknesses of the respective layers in the laminates 10a and 10b are not specifically limited, the thickness of the laminates 10a and 10b can be reduced over the conventional ones so that the volume ratio of the capacity to the outer volume of the packaging bag 701 can be improved.

The laminate 10a and the like is produced, for example, by a method described below. First, the adhesive layer 5 is laminated on one surface of the sheet-shaped paper layer 3 by lamination processing to thereby form the paper substrate 8. Subsequently, the sheet-shaped sealant layer 9 is laminated by lamination processing on the adhesive layer 5 which has been laminated on the paper layer 3. Thus, the laminate 10a having the paper layer 3, the adhesive layer 5, and the sealant layer 9, which are laminated in sequence, is formed. For example, extrusion lamination, dry lamination, or the like can be used as the lamination processing. The production method is not specifically limited, and the laminate 10a can also be formed by extrusion lamination of the sealant layer 9 onto the paper substrate 8 formed by thermal lamination. The laminate 10a or the like can be formed into a bag after it is cut into a predetermined width by slit processing.

Figure 21A:
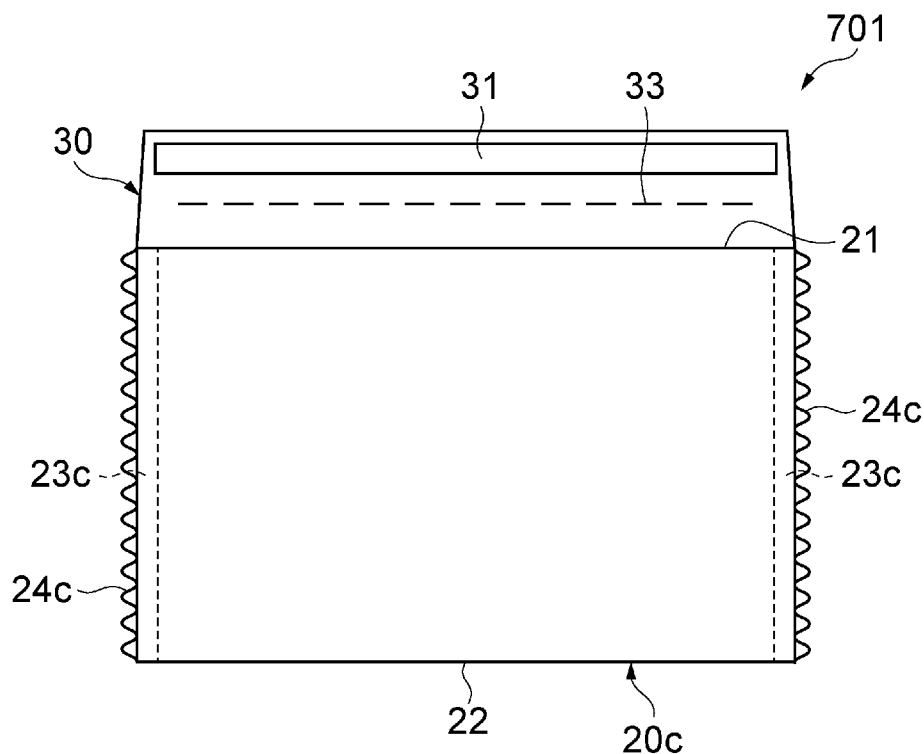
Figure 21B:
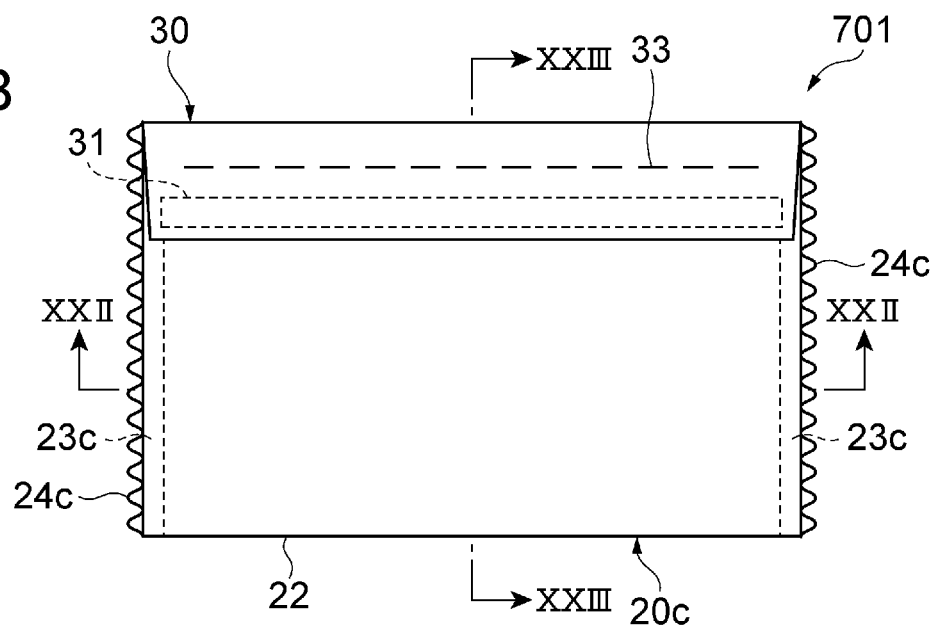
Figure 22:
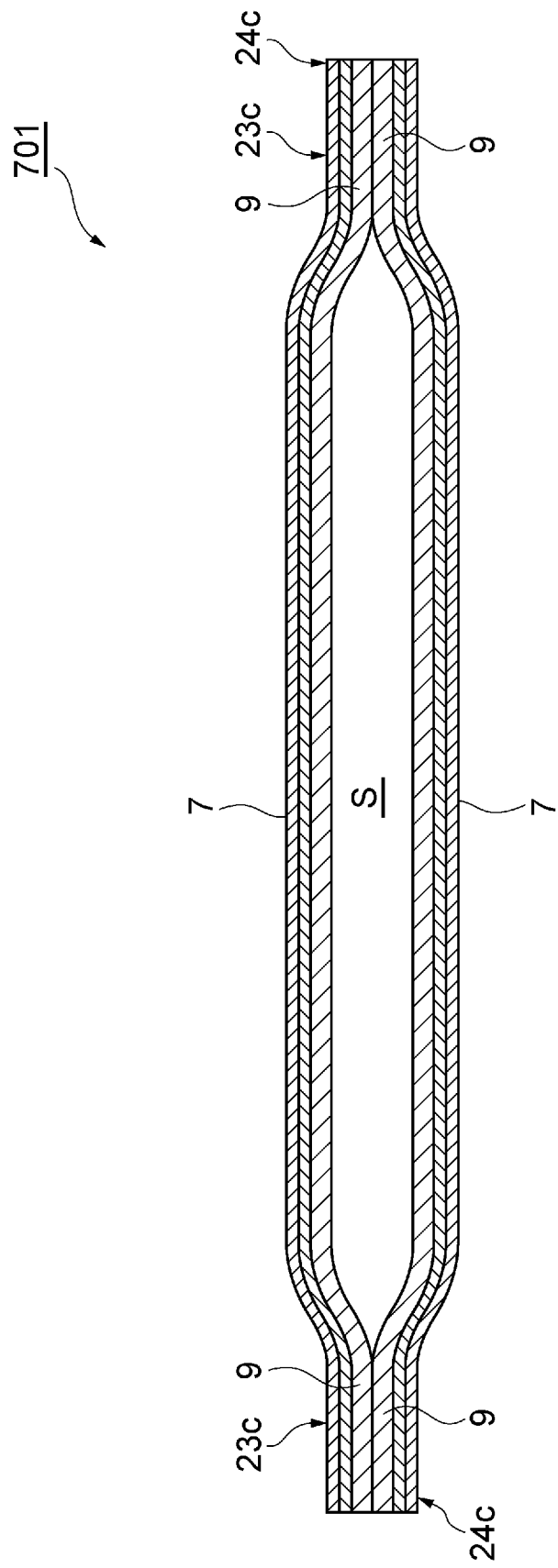
FIG. 22 is a cross-sectional view taken along the line XXII-XXII of FIG. 21B.
Figure 23:
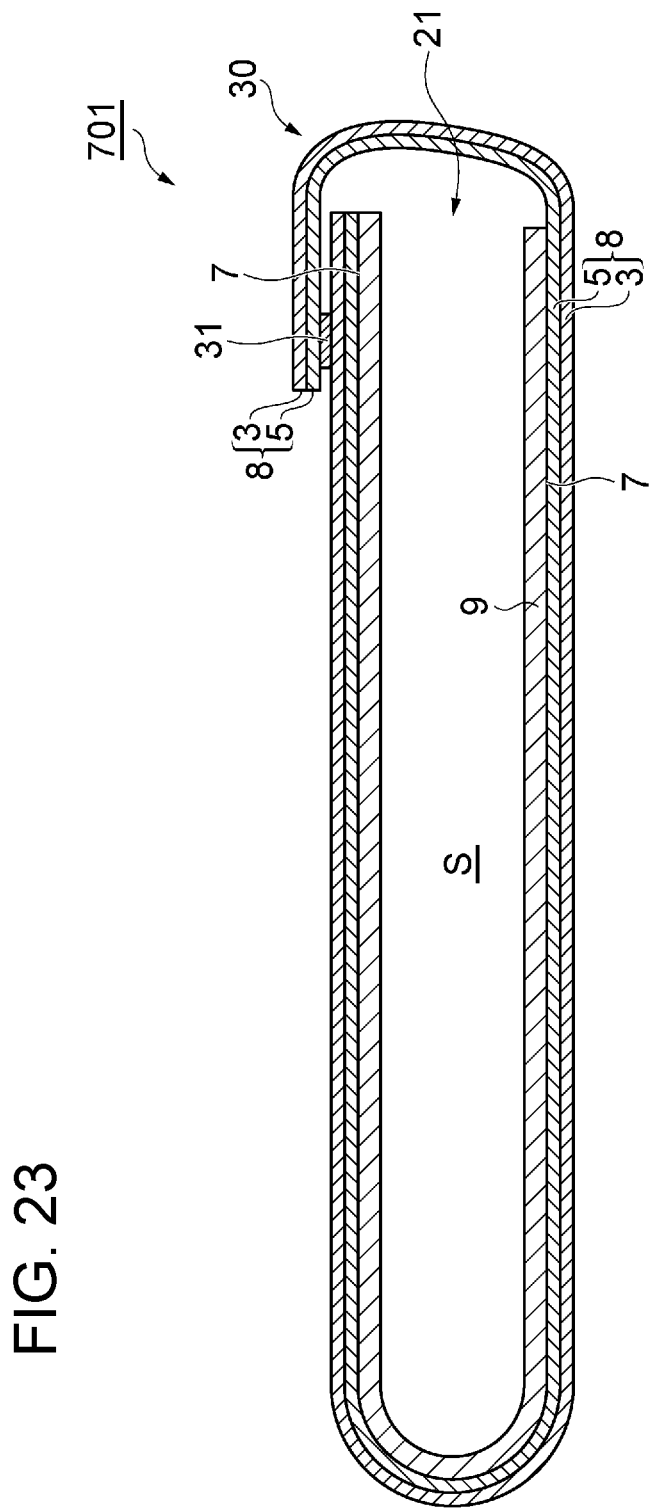
FIG. 23 is a cross-sectional view taken along the line XXIII-XXIII of FIG. 21B.

FIGS. 21A and 21B are plan views of the packaging bag 701 formed of the laminate 10a. As shown in FIGS. 21A and 21B, the packaging bag 701 includes a main body 20c formed in a bag shape with an opening 21, and a sealing section 30 for sealing the opening 21. The packaging bag 701 has a substantially rectangular shape in plan view. In the following description, a direction in which the opening 21 extends is defined as a width direction, and a direction perpendicular to the width direction is defined as an opening direction. FIG. 22 is a cross-sectional view taken along the width direction of the packaging bag 701, and FIG. 23 is a cross-sectional view taken along the opening direction of the packaging bag 701. In the illustrated example, a side of the packaging bag 701 which is opposite to the opening 21 is folded to form a folded section 22. Further, sealed sections 23c are formed on both sides in the width direction of the packaging bag 701. In the sealed section 23c, the sealant layers 9 facing each other are thermally sealed along the opening direction. Thus, the folded section 22 and the sealed sections 23c are formed to thereby define an inner space S in the packaging bag 701 (see FIGS. 22 and 23).

An impact absorption section is formed on the outer edge of the sealed section 23c, extending from one end to the other end in the opening direction. The impact absorption section mitigates drop impact or the like on both end edges in the width direction of the packaging bag 701. The impact absorption section in the present embodiment is formed of a wavy section 24c. That is, the outer edge of the sealed section 23c is formed in a wavy shape which extends outward in the width direction at a regular interval along the opening direction. The size of the wavy form is not specifically limited. For example, the height and pitch of the wave shapes in the wavy section 24c are 2 mm and 8 mm, respectively. The wavy section 24c is softer than the sealed section 23c, and can efficiently absorb impact.

As shown in FIG. 23, the sealing section 30 is formed by the paper substrate 8 extending out of the laminate 10a to the outside of the opening 21. The sealing section 30 may be formed of the laminate 10a. The sealing section 30 can be folded over to cover the opening 21. The sealing section 30 has an adhesion region 31 which extends in the width direction. The adhesion region 31 may be made of a double-sided tape or an adhesive that is prohibited from being re-attached to the main body 20. With this configuration, the sealing section 30 is prohibited from being re-attached when the packaging bag 701 was tampered with. Examples of an adhesive prohibited from being re-attached include a hot melt adhesive.

The packaging bag 701 is produced, for example, by a method described below. First, the elongated laminate 10a is formed by laminating the elongated sealant layer 9 fed out from a roll on the elongated paper substrate 8 fed out from a roll. In the present embodiment, the sealant layer 9 are not laminated in the sealing section 30. Accordingly, the sealant layer 9 is laminated while leaving a predetermined area unlaminated from one end edge of the paper substrate 8 in the direction perpendicular to the longitudinal direction. Further, when the sealing section 30 is formed of the laminate 10a, the sealant layer 9 is laminated on the entire surface of the paper substrate 8. Then, the laminate 10a is folded in the direction perpendicular to the longitudinal direction. Here, the sealant layer 9 of the laminate 10a faces inward. Then, in the laminate 10a thus folded, a portion of the sealant layer 9 corresponding to the sealed section 23c is thermally sealed in the direction perpendicular to the longitudinal direction (opening direction of the packaging bag). Thus, bag-shaped portions are continuously formed in the laminate 10a. Subsequently, the bag-shaped portions continuously formed are separated to thereby obtain the packaging bag 701. Since the impact absorption section is formed of the wavy section 24c in the packaging bag 701, the impact absorption section is formed, for example, by cutting the thermally heated portion into the wavy shape. The adhesion region may be formed in the sealing section 30 in any of the above steps. The production method is not specifically limited. For example, the sealant layer 9 may be thermally sealed after the laminate 10a is cut.

In the present embodiment, the MD direction of the paper substrate 8 and the sealant layer 9 corresponds to the width direction of the packaging bag 701, and the adhesion region 31 extends in the MD direction. Further, for ease of opening along the adhesion region 31, perforations 33 are formed in the sealing section 30. The perforations 33 are formed at positions spaced from the adhesion region 31 to the main body 20 side by a distance of 3 to 20 mm. Accordingly, by cutting the sealing section 30 along the perforations 33, the packaging bag 701 can be easily opened.

According to the packaging bag 701, since the wavy section 24c is provided on the outer edge of the sealed section 23c, drop impact is mitigated by the wavy section 24c, which first comes into contact with the ground when the packaging bag 701 is dropped with the sealed section 23c downward. Moreover, the sealant layer 9 has a thickness in the range of 100 μm to 200 μm, and the paper substrate 8 laminated on the outer side relative to the sealant layer 9 has a bending stiffness in the range of 150 mN to 700 mN. With this configuration in which the paper substrate having the bending stiffness of 150 mN or more is laminated on the sealant layer 9 having a predetermined thickness, the paper substrate 8 is not easily collapsed. Accordingly, the impact which is not absorbed by the wavy section 24 is prevented from being easily transferred to the contents. Thus, in the packaging bag 701 of the present embodiment, the contents can be appropriately protected and do not have indentation made by the bubbles or the like. In addition, when the laminate 10a is provided as a roll, the replacement frequency of the roll can be reduced since the packaging bag 701 is formed of the relatively thin laminate 10a.

Second Embodiment of Alteration

A packaging bag 801 according to the present embodiment differs from the packaging bag 701 of the first embodiment in that it has an impact absorption section of a different shape. The following provides a description mainly of the differences from the packaging bag 701 of the first embodiment. The elements and components that are the same as those of the first embodiment are referred to by the same reference numbers, and detailed description thereof will be omitted.

Figure 24A:
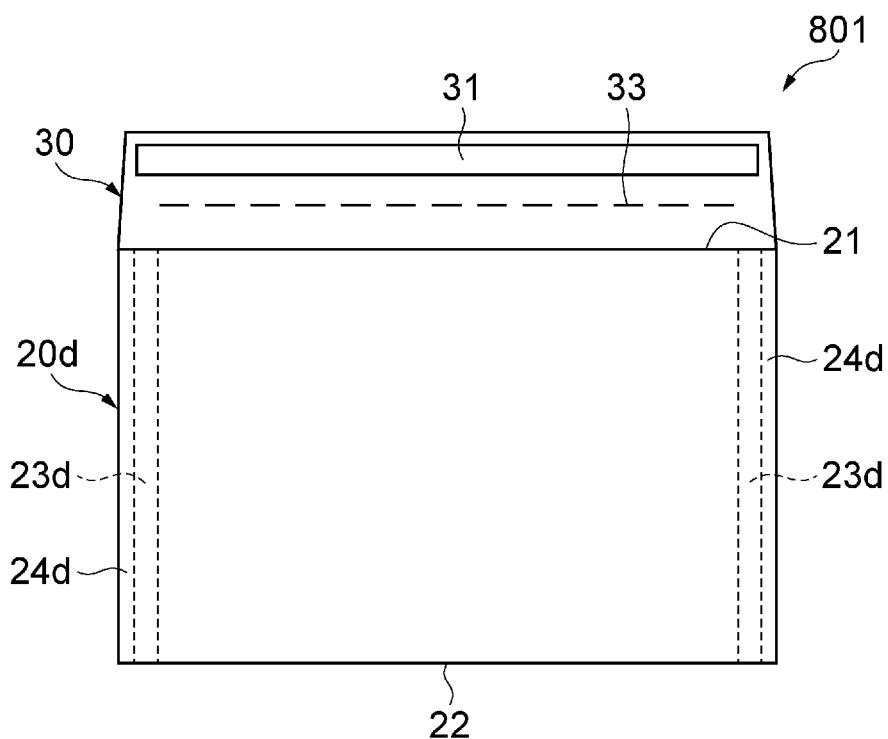
Figure 24B:
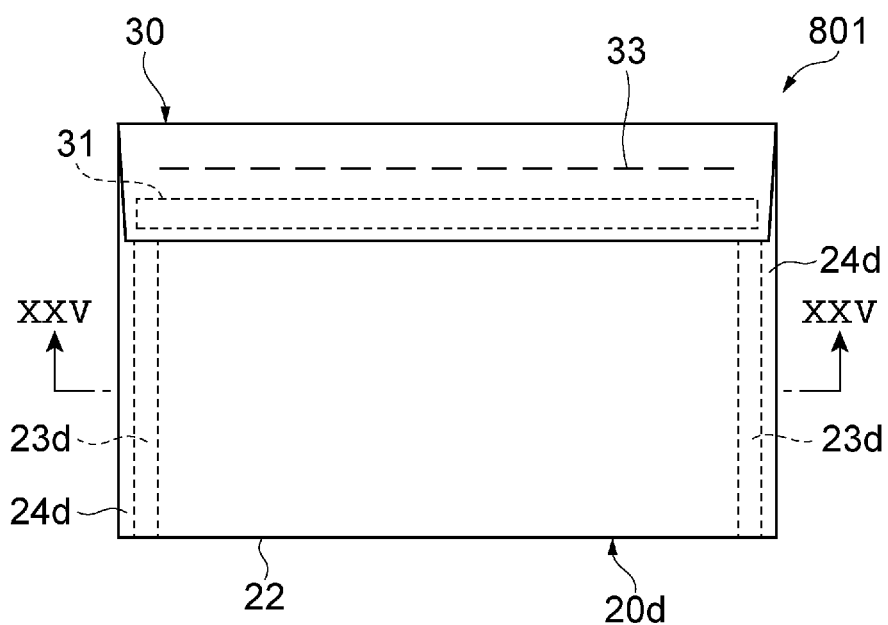
Figure 25:
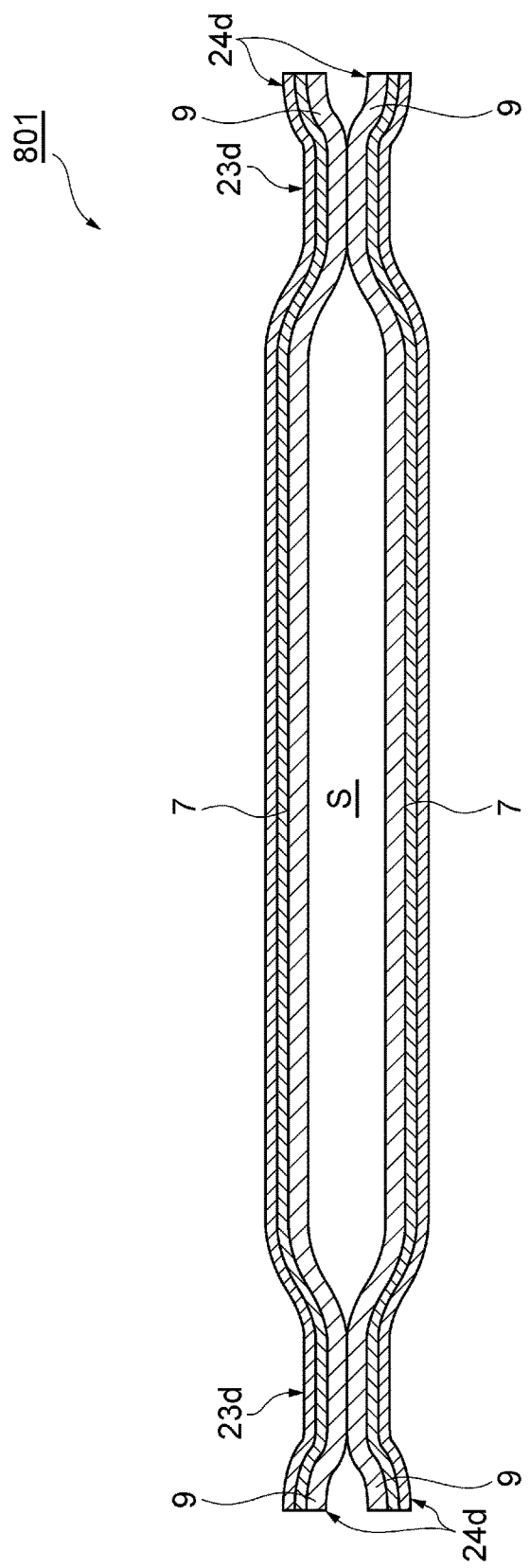
FIG. 25 is a cross-sectional view taken along the line XXV-XXV of FIGS. 24A and 24B.

As shown in FIGS. 24A, 24B, and 25, the packaging bag 801 includes a main body 20d formed in a bag shape with an opening 21, and a sealing section 30 for sealing the opening 21. The packaging bag 801 has a substantially rectangular shape in plan view. In the packaging bag 801, a side opposite to the opening 21 is folded to form a folded section 22. Further, sealed sections 23d are formed on both sides of the packaging bag 801 in the width direction. An impact absorption section is formed on the outer edge of the sealed section 23d, extending from one end to the other end in the opening direction. The impact absorption section in this embodiment is provided by an unsealed section 24d. In the unsealed section 24d, the sealant layers 9 facing each other are not thermally sealed, and the laminates 10a face each other. Accordingly, the unsealed section 24d is softer than the sealed section 23d, and can efficiently absorb impact. As an example, the length in the width direction of the sealed section 23d is 10 mm, and the length in the width direction of the unsealed section 24d is 5 mm.

The packaging bag 801 can be produced by the same method as the packaging bag 701. According to the above production method, since the packaging bags 801 are continuously formed, the sealed section 23d of one packaging bag 801 and the sealed section 23d of the subsequent packaging bag 801 are adjacent to each other with their unsealed sections 24d interposed therebetween. That is, an unsealed portion between the sealed sections 23d is cut to thereby form the impact absorption section (unsealed section 24d). In addition, the packaging bag may have the same configuration as that of the modified example of the third embodiment or the like by using the laminates 10a and 10b described above.

EXAMPLES

The packaging bag of the above alteration will be further described with reference to the examples and comparative examples as below. However, the sizes and the like of the packaging bag are merely examples, and the above embodiments are not limited to what is described in the examples. Further, the packaging bags according to Examples 31, 33 to 41 below have the shape of the packaging bag 701 of the first embodiment of the alteration. Further, the packaging bags according to Example 32 have the shape of the packaging bag 801 of the second embodiment of the alteration. Table 4 shows Examples 31 to 41 and Comparative Examples 31 to 37.

sealant layer made of LLDPE with 150 µm thickness, which were laminated in sequence, and included an unsealed section as an impact absorption section on the outer edge of the sealed section. The width of the sealed section was 10 mm, and the width of the unsealed section was 5 mm.

TABLE 4

| Sample | Paper substrate (Bending stiffness) | Adhesive layer | Sealant (Thickness) | Sealant (Material) | Impact absorption section | Paper substrate (Grammage) |
|---|---|---|---|---|---|---|
| Example 31 | 237 mN | PE 30 µm | 150 µm | LLDPE | Wavy section | 75 g/m² |
| Example 32 | 237 mN | PE 30 µm | 150 µm | LLDPE | Unsealed section | 75 g/m² |
| Example 33 | 159 mN | PE 30 µm | 150 µm | LLDPE | Wavy section | 60 g/m² |
| Example 34 | 214 mN | PE 30 µm | 150 µm | LLDPE | Wavy section | 70 g/m² |
| Example 35 | 393 mN | PE 30 µm | 150 µm | LLDPE | Wavy section | 84 g/m² |
| Example 36 | 531 mN | PE 30 µm | 150 µm | LLDPE | Wavy section | 100 g/m² |
| Example 37 | 237 mN | PE 30 µm | 110 µm | LLDPE | Wavy section | 75 g/m² |
| Example 38 | 237 mN | PE 30 µm | 180 µm | LLDPE | Wavy section | 75 g/m² |
| Example 39 | 237 mN | PE 30 µm | 150 µm | Foamed sealant | Wavy section | 75 g/m² |
| Example 40 | 237 mN | PE 30 µm | 150 µm | Foamed sealant | Wavy section | 75 g/m² |
| Example 41 | 237 mN | PE 30 µm | 180 µm | Foamed sealant | Wavy section | 75 g/m² |
| Comparative Example 31 | 166 mN | — | 2.5 mm | HDPE | — | 80 g/m² |
| Comparative Example 32 | 237 mN | PE 30 µm | — | — | — | 75 g/m² |
| Comparative Example 33 | 237 mN | PE 30 µm | 80 µm | LLDPE | — | 75 g/m² |
| Comparative Example 34 | 237 mN | PE 30 µm | 250 µm | LLDPE | — | 75 g/m² |
| Comparative Example 35 | 93 mN | PE 30 µm | 150 µm | LLDPE | — | 50 g/m² |
| Comparative Example 36 | 961 mN | PE 30 µm | 150 µm | LLDPE | — | 120 g/m² |
| Comparative Example 37 | 237 mN | PE 30 µm | 150 µm | LLDPE | — | 75 g/m² |

Example 31

First, on a paper substrate having a paper layer and an adhesive layer made of PE with 30 µm thickness, a sealant layer made of LLDPE with 150 µm thickness was laminated to thereby obtain a laminate. As the lamination processing, dry lamination was used. Subsequently, both sides of the laminate in the opening direction were thermally sealed with the sealant layer facing inward to thereby obtain the packaging bag of Example 31. The packaging bag had a long side (side in the width direction) of 255 mm length and a short side (side in the opening direction) of 195 mm length, and the sealed section had a wavy section as an impact absorption section. The height and pitch of the wave shapes in the wavy section are 2 mm and 8 mm, respectively. The grammage of the paper substrate was 75 g/m², and the bending stiffness of the paper substrate was 237 mN. The bending stiffness was measured by a loop stiffness tester (manufactured by Toyo Seiki Co., Ltd.). The measurement was performed using a sample, which was a loop of a strip made of a paper substrate having 15 mm width and 160 mm length. The number of samples was five.

Example 32

Example 32 was different from Example 31 in the shape of the impact absorption section. That is, the packaging bag of Example 32 was formed of a laminate composed of a paper substrate having a bending stiffness of 237 mN and the Example 33

In Example 33, the grammage and bending stiffness of the paper substrate were different from Example 31. That is, the packaging bag of Example 33 was formed of a laminate composed of a paper substrate having a bending stiffness of 159 mN and a sealant layer made of LLDPE with a 150 µm thickness, which were laminated in sequence, and included a wavy section as an impact absorption section. The height and pitch of the wave shapes in the wavy section are 2 mm and 8 mm, respectively.

Example 34

In Example 34, the grammage and bending stiffness of the paper substrate were different from Example 31. That is, the packaging bag of Example 34 was formed of a laminate composed of a paper substrate having a bending stiffness of 214 mN and a sealant layer made of LLDPE with 150 µm thickness, which were laminated in sequence, and included a wavy section as an impact absorption section. The height and pitch of the wave shapes in the wavy section are 2 mm and 8 mm, respectively.

Example 35

In Example 35, the grammage and bending stiffness of the paper substrate were different from Example 31. That is, the packaging bag of Example 35 was formed of a laminate composed of a paper substrate having a bending stiffness of 393 mN and a sealant layer made of LLDPE with 150 μm thickness, which were laminated in sequence, and included a wavy section as an impact absorption section. The height and pitch of the wave shapes in the wavy section are 2 mm and 8 mm, respectively.

Example 36

In Example 36, the grammage and bending stiffness of the paper substrate were different from Example 31. That is, the packaging bag of Example 36 was formed of a laminate composed of a paper substrate having a bending stiffness of 531 mN and a sealant layer made of LLDPE with 150 μm thickness, which were laminated in sequence, and included a wavy section as an impact absorption section. The height and pitch of the wave shapes in the wavy section are 2 mm and 8 mm, respectively.

Example 37

In Example 37, the thickness of the sealant layer was different from Example 31. That is, the packaging bag of Example 37 was formed of a laminate composed of a paper substrate having a bending stiffness of 237 mN and a sealant layer made of LLDPE with 110 μm thickness, which were laminated in sequence, and included a wavy section as an impact absorption section. The height and pitch of the wave shapes in the wavy section are 2 mm and 8 mm, respectively.

Example 38

In Example 38, the thickness of the sealant layer was different from Example 31. That is, the packaging bag of Example 38 was formed of a laminate composed of a paper substrate having a bending stiffness of 237 mN and a sealant layer made of LLDPE with 180 μm thickness, which were laminated in sequence, and included a wavy section as an impact absorption section. The height and pitch of the wave shapes in the wavy section are 2 mm and 8 mm, respectively.

Example 39

In Example 39, the configuration of the sealant layer was different from Example 31. That is, the packaging bag of Example 39 was formed of a laminate composed of a paper substrate having a bending stiffness of 237 mN and a foamed sealant layer having a thickness of 150 μm, which were laminated by extrusion lamination, and included a wavy section as an impact absorption section. The height and pitch of the wave shapes in the wavy section are 2 mm and 8 mm, respectively. The foamed sealant layer was formed of a foamed film composed of a foam layer with 100 μm thickness made of polyolefin-based resin and a sealant layer with 50 μm thickness.

Example 40

In Example 40, the configuration of the sealant layer was different from Example 31. That is, the packaging bag of Example 40 was formed of a laminate composed of a paper substrate having a bending stiffness of 237 mN and a foamed sealant layer with 150 μm thickness, which were laminated in sequence, and included a wavy section as an impact absorption section. The height and pitch of the wave shapes in the wavy section are 2 mm and 8 mm, respectively. The foamed sealant layer was formed of a foamed film composed of a foam layer with 75 μm thickness made of polyolefin-based resin and a polyethylene layer with 75 μm thickness.

Example 41

In Example 41, the configuration of the sealant layer was different from Example 31. That is, the packaging bag of Example 41 was formed of a laminate composed of a paper substrate having a bending stiffness of 237 mN and a foamed sealant layer with 180 μm thickness, which were laminated in sequence, and included a wavy section as an impact absorption section. The height and pitch of the wave shapes in the wavy section are 2 mm and 8 mm, respectively. The foamed sealant layer was formed of a foamed film composed of a foam layer with 110 μm thickness made of polyolefin-based resin and a polyethylene layer with 70 μm thickness.

Comparative Example 31

In the packaging bag of Comparative Example 31, an air bubble cushioning material made of PE was disposed inside a packaging bag was made of kraft paper. The air bubble cushioning material and kraft paper were bonded to each other by an adhesive. The kraft paper had a grammage of 80 g/m$^2$ and a bending stiffness of 166 mN. In this packaging bag, a sealed section was provided on one of the long sides, and an adhesive tape was adhered to the sealed section. Further, in the packaging bag of Comparative Example 31, an impact absorption section was not provided.

Comparative Example 32

Comparative Example 32 was different from Example 31 in that it did not include a sealant layer. That is, the packaging bag of Comparative Example 32 was formed by folding over a paper substrate having a bending stiffness of 237 mN, and adhering both ends in the width direction. Further, in the packaging bag of Comparative Example 32, an impact absorption section was not provided.

Comparative Example 33

In Comparative Example 33, the thickness of the sealant layer was different from Example 31. That is, the packaging bag of Comparative Example 33 was formed of a laminate composed of a paper substrate having a bending stiffness of 237 mN and a sealant layer made of LLDPE with 80 μm thickness, which were laminated in sequence. Further, in the packaging bag of Comparative Example 33, an impact absorption section was not provided.

Comparative Example 34

In Comparative Example 34, the thickness of the sealant layer was different from Example 31. That is, the packaging bag of Comparative Example 34 was formed of a laminate composed of a paper substrate having a bending stiffness of 237 mN and a sealant layer made of LLDPE with 250 μm thickness, which were laminated in sequence. Further, in the packaging bag of Comparative Example 34, an impact absorption section was not provided.

Comparative Example 35

In Comparative Example 35, the grammage and bending stiffness of the paper substrate were different from Example 31. That is, the packaging bag of Comparative Example 35 was formed of a laminate composed of the paper substrate having a grammage of 50 g/m² and a bending stiffness of 93 mN and the LLDPE sheet having the thickness of 150 μm, which were laminated in sequence. Further, in the packaging bag of Comparative Example 35, an impact absorption section was not provided.

Comparative Example 36

In Comparative Example 36, the grammage and bending stiffness of the paper substrate were different from Example 31. That is, the packaging bag of Comparative Example 36 was formed of the laminate composed of the paper substrate having the grammage of 120 g/m² and the bending stiffness of 961 mN and the LLDPE sheet having the thickness of 150 μm, which were laminated in sequence. Further, in the packaging bag of Comparative Example 36, an impact absorption section was not provided.

Comparative Example 37

Comparative Example 37 was different from Example 31 in that it did not include an impact absorption section. That is, the packaging bag of Comparative Example 37 was formed of a laminate composed of a paper substrate having a bending stiffness of 237 mN and a sealant layer made of LLDPE with 150 μm thickness, which were laminated in sequence.

For Examples 31 to 41 and Comparative Examples 31 to 37, the impact resistance and strength were tested to evaluate the basic performance practically required as a packaging bag.

An impact resistance test and a strength test were tests to check whether a packaging bag and the contents inside are not damaged when a certain impact is applied to the packaging bag containing the contents. The test was performed by dropping a sample containing the contents from a position of 70 cm height. The contents were a compact disk (CD) stored in a plastic case. The test was performed 7 times per sample with different impact locations. The impact locations were front and rear surfaces of the packaging bag, a side of the packaging bag on the sealing section side, a side of the packaging bag opposite to the sealing section, one of the sides in the width direction of the packaging bag, a corner between the other of the sides in the width direction and the side on the sealing section side, and a corner between the other of the sides in the width direction and the side opposite to the sealing section. The number of samples was 50. In the impact resistance test, when the number of plastic cases broken was not more than 30 out of 50 samples, it was evaluated as not having a practical problem. In the strength test, when the number of packaging bags broken was not more than 30 out of 50 samples, it was evaluated as not having a practical problem. Table 5 shows the results of these tests.

TABLE 5

| Sample | Number of contents broken | Number of packaging bags broken |
| --- | --- | --- |
| Example 31 | 20 | 5 |
| Example 32 | 17 | 1 |
| Example 33 | 30 | 21 |
| Example 34 | 21 | 6 |
| Example 35 | 12 | 1 |
| Example 36 | 10 | 1 |
| Example 37 | 29 | 11 |
| Example 38 | 15 | 2 |
| Example 39 | 17 | 23 |
| Example 40 | 16 | 15 |
| Example 41 | 13 | 26 |
| Comparative Example 31 | 40 | 29 |
| Comparative Example 32 | 47 | 32 |
| Comparative Example 33 | 32 | 15 |
| Comparative Example 34 | 14 | 2 |
| Comparative Example 35 | 38 | 23 |
| Comparative Example 36 | 12 | 0 |
| Comparative Example 37 | 34 | 2 |

As the results of evaluation, a practical problem was not found in Examples 31 to 41. On the other hand, Comparative Examples 31, 32, 35, and 37 were evaluated as having a practical problem in the impact resistance test. In particular, in Comparative Examples 31 and 32 which have low strength as the entire external material that constitutes the packaging bag, breakage was found in 40 samples or more out of 50 samples. Further, Comparative Example 32 was evaluated as having a practical problem in the strength test as well. Comparative Examples 34 and 36 were evaluated as having no practical problem in both the impact resistance test and strength test. However, Comparative Example 34 was evaluated as having decreased processability due to the sealant layer being too thick. Further, Comparative Example 36 was evaluated as having decreased processability due to the bending stiffness being too high.

Moreover, for Examples 31, 39 to 41, and Comparative Example 31, a vibration test was performed as another evaluation method. A vibration test is a test to check whether a packaging bag and the contents inside are not damaged by vibration when the packaging bag containing the contents is transported. The test was performed under the condition that samples (Examples 31, 39 to 41, and Comparative Example 31) were horizontally stacked in a cardboard box with a weight of 2.5 kg placed on the samples. Further, the test was performed under the conditions of land transportation of 2000 km or more by using a transport vehicle (compliant to JIS Z 0200). The number of samples was 3. The contents were a plastic CD case, a plastic CD case wrapped with 20 μm OPP film, and a magazine, which were packaged together. The vibration test was evaluated based on the area of the abrasion marks created on the contents. The area of the abrasion marks which is less than 20% of the total area was rated as level 1, 20% or more and less than 40% was rated as level 2, 40% or more and less than 60% was rated as level 3, 60% or more and less than 80% was rated as a level 4, and 80% or more and less than 100% was rated as a level 5. The levels 1 and 2 were regarded as high quality.

As a result, while Comparative Example 31 was rated as level 4, Examples 31, and 39 to 41 were evaluated as high quality (level 1 or 2). It was confirmed that Examples 39 to 41, which use a foamed film as a sealant layer, had high vibration resistance.

For the packaging bags 701 and 801 formed of the above laminates 10a and 10b, the supplementary notes are provided as below.

(Supplementary Note 11)

A packaging bag made of a laminate formed in a bag shape, the laminate being composed of a paper substrate, and a sealant layer laminated on an inner side relative to the paper substrate, which are laminated with the sealant layer facing inward, wherein a sealed section in which the sealant layers facing each other are sealed is provided in at least part of the periphery of the packaging bag, an impact absorption section is formed of the laminate on the outer edge of the sealed section, a bending stiffness of the paper substrate in an MD direction is in a range of 150 mN to 700 mN, and a thickness of the sealant layer is in a range of 100 µm to 200 µm.

(Supplementary Note 12)
The packaging bag according to the supplementary note 1, wherein the bending stiffness of the paper substrate in the MD direction is in a range of 200 mN to 600 mN.

(Supplementary Note 13)
The packaging bag according to the supplementary note 1 or 2, wherein the impact absorption section is an unsealed section formed on the outer edge of the sealed section, or a wavy section which is the outer edge of the sealed section formed in a wavy shape.

(Supplementary Note 14)
A method for producing the packaging bag according to any one of the supplementary notes 11 to 13, the method including: laminating an elongated sealant layer fed out from a roll on an elongated paper substrate fed out from a roll; folding a laminate composed of the paper substrate and the sealant layer in a direction perpendicular to the longitudinal direction with the sealant layer facing inward, and then sealing parts of the sealant layers facing each other to form a bag, wherein, in the step of laminating the sealant layer on the paper substrate, the sealant layer is laminated while leaving a predetermined area unlaminated from one end edge of the paper substrate in the direction perpendicular to the longitudinal direction.

In the packaging bag according to the supplementary note 11, since the impact absorption section is provided on the outer edge of the sealed section, drop impact is mitigated by the impact absorption section, which first comes into contact with the ground when the packaging bag is dropped with the sealed section downward. Moreover, the sealant layer has the thickness in the range of 100 µm to 200 µm, and the paper substrate laminated on the outer side relative to the sealant layer has the bending stiffness in the range of 150 mN to 700 mN. With this configuration in which the paper substrate having the bending stiffness of 150 mN or more is laminated on the sealant layer having a predetermined thickness, the paper substrate is not easily collapsed. Accordingly, the impact which is not absorbed by the impact absorption section is prevented from being easily transferred to the contents. In the conventional art in which a plastic air bubble wrap sheet is simply attached to general kraft paper as a cushioning material, the strength may be low as a packaging bag, which causes drop impact to be transferred to the contents. In the above-mentioned packaging bag, however, the contents can be appropriately protected. In addition, according to the configuration of the above packaging bag, a plastic air bubble wrap sheet is not provided on the inner surface. Accordingly, the contents do not have indentation made by the bubbles or the like. In addition, when the laminate is provided as a roll, the replacement frequency of the roll can be reduced since the packaging bag is formed of the relatively thin laminate. Moreover, when the paper substrate has the bending stiffness of more than 700 mN or the sealant layer has the thickness of more than 200 µm, processing of the laminate into a packaging bag will be laborious. Therefore, the paper substrate preferably has the bending stiffness of 700 mN or less and the sealant layer preferably has the thickness of 200 µm or less. Further, the term "bending stiffness" as used herein refers to stiffness of the material expressed by a load applied when a sample, which has been cut with a predetermined width and length and formed in a loop shape, is pressed to collapse. The bending stiffness can be measured by using a measurement machine available in the market, for example, a loop stiffness tester. In the packaging bag of the supplementary note 13, the sealant layers facing each other are not sealed in the unsealed section. Therefore, the unsealed section has higher flexibility than the sealed section. Further, in the wavy section, which is formed by continuous projecting pieces and recessed pieces, the projecting pieces have high flexibility compared with the sealed section. Thus, the impact absorption section having high flexibility compared with the sealed section can effectively absorb an impact. Further, according to the production method of the supplementary note 14, the thickness of the cushioning material can be reduced to thereby increase the length of the cushioning material per roll. This allows for reduction of the replacement frequency of the roll, leading to improvement in production efficiency.

INDUSTRIAL APPLICABILITY

The present invention is applicable to packaging bags that are able to appropriately protect the contents.

REFERENCE SIGNS LIST 1, 1a, 1b, 101, 101a, 201, 201a, 301, 301a, 401, 401a, 501, 501a, 601, 601a, 701, 801 . . . Packaging bag; 3 . . . Paper layer; 5 . . . Adhesive layer; 7 . . . Foamed sheet; 8 . . . Paper substrate; 9 . . . Sealant layer; 10, 10a, 10b . . . Laminate; 20, 20c . . . Main body; 23, 23b, 23c, 23d, 105, 105a, 106, 106a . . . Sealed section; 24a, 24c . . . Wavy section; 24b, 24d, 108 . . . Unsealed section; 30 . . . Sealing section.

What is claimed is:
1. A packaging bag made of a laminate formed in a bag shape, the laminate comprising:
  a paper substrate,
  a foamed sheet made of polyolefin resin laminated on an inner side relative to the paper substrate, and,
  a sealant layer laminated on an inner side relative to the foamed sheet, which are laminated with the sealant layer facing inward,
  wherein a thickness of the foamed sheet is in a range of 0.8 mm to 5.0 mm, an expansion ratio of the foamed sheet is in a range of 15 to 50 times, and a bending stiffness of the paper substrate in an MD direction is in a range of 200 mN to 600 mN.
2. The packaging bag of claim 1, wherein the expansion ratio of the foamed resin sheet is in a range of 30 to 40 times.
3. The packaging bag of claim 1, further comprising
  a sealed section in which the sealant layers facing each other are sealed is provided in at least part of a periphery of the packaging bag, and
  an impact absorption section is formed of the laminate on an outer edge of the sealed section.
4. The packaging bag of claim 3, wherein the impact absorption section is an unsealed section formed on the outer edge of the sealed section, or a wavy section which is the outer edge of the sealed section formed in a wavy shape.
5. The packaging bag of claim 1, further comprising:
  a main body formed in a bag shape with an opening; and
  a sealing section that seals the opening of the main body.

6. The packaging bag of claim 5, wherein
either one of the main body and the sealing section has an adhesion region that adheres the main body and the sealing section, and
the adhesion region is formed of a double-sided tape or an adhesive which does not permit re-attachment between the main body and the sealing section.

7. The packaging bag of claim 6, wherein
a thickness of the adhesion region is 50 μm or more, and
the adhesive that constitutes the adhesion region is a synthetic rubber-based thermoplastic adhesive having viscosity at 140° C. of 50000 mPa·s or more.

8. The packaging bag of claim 7, wherein the adhesive is a styrene-isoprene based thermoplastic adhesive.

9. The packaging bag of claim 5, wherein perforations are formed in the sealing section.

10. The packaging bag of claim 5, wherein the sealing section has a tab which is formed by cutting the sealing section.

11. The packaging bag of claim 10, wherein the tab extends from a center to an end of the sealing section in a width direction.

12. The packaging bag of claim 10, wherein the perforations are formed continuously from the tab in the sealing section.

13. The packaging bag of claim 10, wherein a tear tape is attached continuously from the tab in the sealing section.

14. The packaging bag of claim 10, wherein the tab is formed at a position spaced from the adhesion region by 3 to 20 mm.

15. The packaging bag of claim 10, wherein the packaging bag is formed in a pillow shape.

16. The packaging bag of claim 1, wherein the packaging bag has a plurality of storage spaces.

17. The packaging bag of claim 3, wherein the thickness of the foamed sheet is in a range of 0.8 mm to 2.5 mm.

18. The packaging bag of claim 17, wherein the paper substrate comprises a paper layer and an adhesive layer, wherein the adhesive layer is in direct contact with the paper layer and the foamed sheet.

19. The packaging bag of claim 1, wherein the paper substrate comprises a paper layer and an adhesive layer, wherein the adhesive layer is in direct contact with the paper layer and the foamed sheet.

* * * * *